United States Patent
Park et al.

(10) Patent No.: US 7,688,816 B2
(45) Date of Patent: Mar. 30, 2010

(54) MAINTAINING PACKET SEQUENCE USING CELL FLOW CONTROL

(76) Inventors: Jinsoo Park, 295 Highland St., Leonia, NJ (US) 07605; Hung-Hsiang Jonathan Chao, 3 Luccarelli Dr., Holmdel, NJ (US) 07733

( * ) Notice: Subject to any disclaimer, the term of this patent is extended or adjusted under 35 U.S.C. 154(b) by 1021 days.

(21) Appl. No.: 11/004,260

(22) Filed: Dec. 3, 2004

(65) Prior Publication Data
US 2005/0201400 A1  Sep. 15, 2005

Related U.S. Application Data

(60) Provisional application No. 60/553,361, filed on Mar. 15, 2004.

(51) Int. Cl.
*H04L 12/56* (2006.01)
(52) U.S. Cl. ........................ 370/389; 370/412
(58) Field of Classification Search ........................ None
See application file for complete search history.

(56) References Cited

U.S. PATENT DOCUMENTS

| | | | | |
|---|---|---|---|---|
| 6,128,283 | A * | 10/2000 | Sabaa et al. | 370/236 |
| 6,370,114 | B1 * | 4/2002 | Gullicksen et al. | 370/229 |
| 6,859,435 | B1 * | 2/2005 | Lee et al. | 370/231 |
| 6,982,975 | B1 * | 1/2006 | Aramaki et al. | 370/388 |
| 7,120,149 | B2 * | 10/2006 | Salamat | 370/394 |
| 7,400,629 | B2 * | 7/2008 | Blanc et al. | 370/394 |
| 2002/0012344 | A1 * | 1/2002 | Johnson et al. | 370/389 |
| 2003/0016686 | A1 * | 1/2003 | Wynne et al. | 370/412 |
| 2003/0048792 | A1 * | 3/2003 | Xu et al. | 370/400 |
| 2003/0118052 | A1 * | 6/2003 | Kuhl et al. | 370/474 |
| 2004/0141504 | A1 * | 7/2004 | Blanc et al. | 370/394 |
| 2005/0002334 | A1 | 1/2005 | Chao | |

OTHER PUBLICATIONS

Leon-Garcia, et al; "Communication Networks: Fundamental Concepts and Key Architectures"; 2000; McGraw-Hill higher Education; pp. 278-285.*
U.S. Appl. No. 60/479,733, filed Jun. 10, 2003, Chao.

* cited by examiner

*Primary Examiner*—Hong Cho
*Assistant Examiner*—Robert C Scheibel
(74) *Attorney, Agent, or Firm*—Woodcock Washburn LLP

(57) ABSTRACT

Packets out-of-sequence problem can be solved by using a window flow control scheme that can dispatch traffic at the cell level, in a round robin fashion, as evenly as possible. Each VOQ at the input port has a sequence head pointer that is used to assign sequence numbers (SN) to the cells. Also a sequence tail pointer is available at each VOQ that is used to acknowledge and limit the amount of cells that can be sent to the output ports based on the window size of the scheme. Each VIQ at the output port has a sequence pointer or sequence number (SN) pointer that indicates to the VIQ which cell to wait for. Once the VIQ receives the cell that the SN pointer indicated, the output port sends an ACK packet back to the input port. By using sequence numbers and the relevant pointers, the packet out-of-sequence problem is solved.

23 Claims, 19 Drawing Sheets

MAINTAINING PACKET SEQUENCE USING CELL FLOW CONTROL

§ 0.1 RELATED APPLICATIONS

This application claims benefit to U.S. Provisional Application Ser. No. 60/553,361, titled "MAINTAINING PACKET SEQUENCE INTEGRITY IN A BUFFERED MULTI-PATH PACKET SWITCH USING A WINDOW FLOW CONTROL SCHEME," filed on Mar. 15, 2004 and listing H. Jonathan Chao and Jinsoo Park as inventors (referred to as "the '361 provisional"). That application is incorporated herein by reference. The scope of the present invention is not limited to any requirements of the specific embodiments described in that application.

§ 0.2 FEDERAL FUNDING

This invention was made with Government support and the Government may have certain rights in the invention as provided for by grant number ANI-9906673 by the National Science Foundation.

§ 1. BACKGROUND OF THE INVENTION

§ 1.1 Field of the Invention

The present invention concerns communications. In particular, the present invention concerns packet cell re-sequencing in a switch.

§ 1.2 Background Information

To keep pace with Internet traffic growth, researchers continually explore transmission and switching technologies. For instance, it has been demonstrated that hundreds of signals can be multiplexed onto a single fiber with a total transmission capacity of over 3 Tbps and an optical cross-connect system (OXC) can have a total switching capacity of over 2 Pbps. However, the capacity of today's (Year 2003) core Internet Protocol (IP) routers remains at a few hundred Gbps, or a couple Tbps in the near future.

It still remains a challenge to build a very large IP router with a capacity of tens Tbps or more. The complexity and cost of building such a large-capacity router is much higher than building an optical cross connect system (OXC). This is because packet switching may require processing (e.g., classification and table lookup), storing, and scheduling packets, and performing buffer management. As the line rate increases, the processing and scheduling time available for each packet is proportionally reduced. Also, as the router capacity increases, the time for resolving output contention becomes more constrained.

Demands on memory and interconnection technologies are especially high when building a large-capacity packet switch. Memory technology very often becomes a bottleneck of a packet switch system. Interconnection technology significantly affects a system's power consumption and cost. As a result, designing a good switch architecture that is both scalable to handle a very large capacity and cost-effective remains a challenge.

The numbers of switch elements and interconnections are often critical to the switch's scalability and cost. Since the number of switch elements of single-stage switches is proportional to the square of the number of switch ports, single-stage architecture is not attractive for large switches. On the other hand, multi-stage switch architectures, such as a Clos network type switch, is more scalable and requires fewer switch elements and interconnections, and is therefore more cost-effective.

FIG. 1 shows a core router (CR) architecture 100 which includes line cards 110,120 a switch fabric 130, and a route controller (not shown) for executing routing protocols, maintenance, etc. The router 100 has up to N ports and each port has one line card. (Note though that some switches have ports that multiplex traffic from multiple input line cards at the ingress and de-multiplexes the traffic from the switch fabric to multiple line cards at the egress.) A switch fabric 130 usually includes multiple switch planes 140 (e.g., up to p in the example of FIG. 1) to accommodate high-speed ports.

A line card 110,120 usually includes ingress and/or egress functions and may include one or more of a transponder (TP) 112,122, a framer (FR) 114,124, a network processor (NP) 116,126, and a traffic manager (TM) 118,128. A TP 112 may be used to perform optical-to-electrical signal conversion and serial-to-parallel conversion at the ingress side. At the egress side, it 122 may be used to perform parallel-to-serial conversion and electrical-to-optical signal conversion. An FR 114, 124 may be used to perform synchronization, frame overhead processing, and cell or packet delineation. An NP 116,126 may be used to perform forwarding table lookup and packet classification. Finally, a TM 118,128 may be used to store packets and perform buffer management, packet scheduling, and any other functions performed by the router architecture (e.g., distribution of cells or packets in a switching fabric with multiple planes).

A switch fabric is a device that cross-connects packets from an input port (i.e., packet arriving port) to an output port (i.e., packet departing port) for unicast traffic, and to multiple output ports for multicast traffic. The switch fabric may operate at very high speed (e.g., new configuration in every 200 nsec).

When a packet arrives at CR 100, it determines an outgoing line to which the packet is to be transmitted. Variable length packets may be segmented into fixed-length data units, called "cells" without loss of generality, when entering CR 100. The cells may be re-assembled into packets before they leave CR 100. Packet segmentation and reassembly is usually performed by NP 116,126 and/or TM 118,128.

FIG. 2 illustrates a multi-plane multi-stage packet switch architecture 200. The switch fabric 230 may include p switch planes 240. In this exemplary architecture 200, each plane 240 is a three-stage Benes network. Modules in the first, second, and third stages are denoted as Input Module (IM) 242, Center Module (CM) 244, and Output Module (OM) 246. IM 242, CM 244, and OM 246 have many common features and may be referred to generally as a Switch Module (SM).

Traffic enters the switch 200 via an ingress traffic manager (TMI) 210 and leaves the switch 200 via an egress traffic manager (TME) 220. The TMI 210 and TME 220 can be integrated on a single chip. Therefore, the number of TM chips may be the same as the number of ports (denoted as N) in the system 200. Cells passing through the switch 200 via different paths may experience different queuing delays if the switch fabric has a queuing buffer in it. These different delays may result in cells arriving at a TME 220 out of sequence. FIG. 2 illustrates multiple paths between TMI(0) 210a and TME(0) 220a.

In the embodiment 200 illustrated in FIG. 2, the first stage of a switch plane 240 includes k IMs 242, each of which has n inputs and m outputs. The second stage includes m CMs 244, each of which has k inputs and k outputs. The third stage includes k OMs 246, each of which has m inputs and n outputs. If n, m, and k are equal to each other, the three modules 242,244,246 may have identical structures.

From the TMI 210 to the TME 220, a cell traverses four internal links: (i) a first link from a TMI 210 to an IM 242; (ii) a second link from the IM 242 to a CM 244; (iii) a third link from the CM 244 to an OM 246; and (iv) a fourth link from the OM 246 to a TME 220.

In such a switch 200, as well as other switches, a number of issues may need to be considered. Such issues may include packet cell re-sequencing.

The switch fabric may be required to deliver packets belonging to the same flow in order. Generally speaking, a flow refers to a virtual connection from a source end system to a destination end system. However, in this specification, a "flow" will be used to refer to a packet stream with the same input port and the same output port. If packets belonging to the same flow are not delivered in order through the switch fabric, the switch fabric is assumed to have a packet out-of-sequence problem.

An input port normally sends cells in order for all flows. However, if the switch fabric has multiple paths and each path may have a different delay due to the contention for the same output link at each stage of the switch fabric, the output port may receive cells out-of-order. Therefore, the output port needs to re-sequence cells according to their sequence number (SN) at each virtual input queue (VIQ).

§ 1.3 Previous Approaches to Solve Packet Out-of-Sequence Problems in Buffered Multi-Path Switch Fabrics, and Limitations of Such Approaches Two methods have been proposed to solve the packet out-of-sequence problem in the buffered multi-path switch fabric. The first method re-sequences packets at the output port. The packet re-sequencing may require several conditions. First, each packet should carry a sequence number. One exemplary sequence number is a time-stamp based on the arrival time of the packet at the input port. If the sequence number is large, the overhead ratio (of sequence number size to cell or packet size) can be too big to be practical. A high overhead ratio can cause increased implementation costs, performance degradation due to reduced internal speedup, or both. Second, the degree of packet out-of-sequence should be bounded to ensure successful re-sequencing. Since Internet traffic is very complicated, it is difficult to estimate the degree of packet out-of-sequence that will occur. Even when the degree of packet out-of-sequence is bounded, implementing the re-sequencing circuits increases costs.

The second method to solve the packet out-of-sequence problem is to send all packets belonging to the same flow over the same path. This emulates a single-path switch fabric for a given flow, thus avoiding packet out-of-sequence problems altogether. This idea is attractive in the sense that the packet out-of-sequence problem only matters for the packets belong to the same flow. This scheme is referred to as "static hashing." Static hashing advantageously eliminates the re-sequencing buffer at the output port. Since packets belonging to the same flow take the same path in the multi-path switch fabric, they will arrive at the output port in the proper sequence.

Note that re-sequencing is different from re-assembly. Re-sequencing is a term used to describe an operation to correct the situation when packets belonging to the same flow arrive at the output port out-of-sequence. Re-assembly is a term used to describe reconstituting packets when the packets are segmented into cells and are interleaved in the switch fabric. For purposes of this discussion, it is assumed that packets are not interleaved in the switch fabric. In other words, all cells belonging to the same packet will be sent back-to-back, without any intervening cells. Therefore, with static hashing, the output port has no re-sequencing buffer, nor does it have a re-assembly buffer.

One problem of the static hashing scheme is the potential for load imbalance. Since each flow may have different bandwidth, it is possible that one path will be more congested than another path, or other paths. This may complicate choosing proper paths to route packets from an input port to an output port. If paths are not properly chosen, the probability of congesting one path increases, adversely impacting switch performance.

U.S. Provisional Application Ser. No. 60/479,733 (incorporated herein by reference), titled "A HIGHLY SCALABLE MULTI-PLANE MULTI-STAGE BUFFERED PACKET SWITCH", filed on Jun. 19, 2003, and listing Hung-Hsiang Jonathan Chao and Jinsoo Park as inventors, and U.S. patent application Ser. No. 10/776,574 (incorporated herein by reference) titled "PACKET SEQUENCE MAINTENANCE WITH LOAD BALANCING, AND HEAD-OF-LINE BLOCKING AVOIDANCE IN A SWITCH" and listing Hung-Hsiang Jonathan Chao and Jinsoo Park as inventors, describe some approaches to the packet (or cell) out-of-sequence problem. Although such approaches represent an advance solution to packet and cell out-of-sequence problems, better solutions would be useful.

§ 2. SUMMARY OF THE INVENTION

At least some exemplary embodiments consistent with the present invention perform a method for maintaining packet sequence in a system having an ingress traffic manager component having a plurality of virtual output queues, and an egress traffic manager component having a plurality of virtual input queues and a plurality of reassembly queues. Such a method may (a) send cells from a virtual output queue in such a way that limits a potential number of out-of-sequence cells, and (b) re-sequence any out-of-sequence cells at the egress traffic manager component.

In at least some embodiments consistent with the present invention, the potential number of out-of-sequence cells is limited by (a) maintaining an available cell count for the virtual output queue, and (b) sending a cell from the virtual output queue only if the cell count is greater than a predetermined value.

In at least some embodiments consistent with the present invention, an available cell counter (ACC) may be maintained by (a) increasing the ACC when the output port corresponding the virtual output queue (VOQ) moves one or more in-sequence cells from a virtual input queue (VIQ) to a reassembly queue (RAQ), and (b) decreasing the ACC when the VOQ sends one or more cells.

§ 3. BRIEF DESCRIPTION OF THE DRAWINGS

§ 4. DETAILED DESCRIPTION

Figure 1:
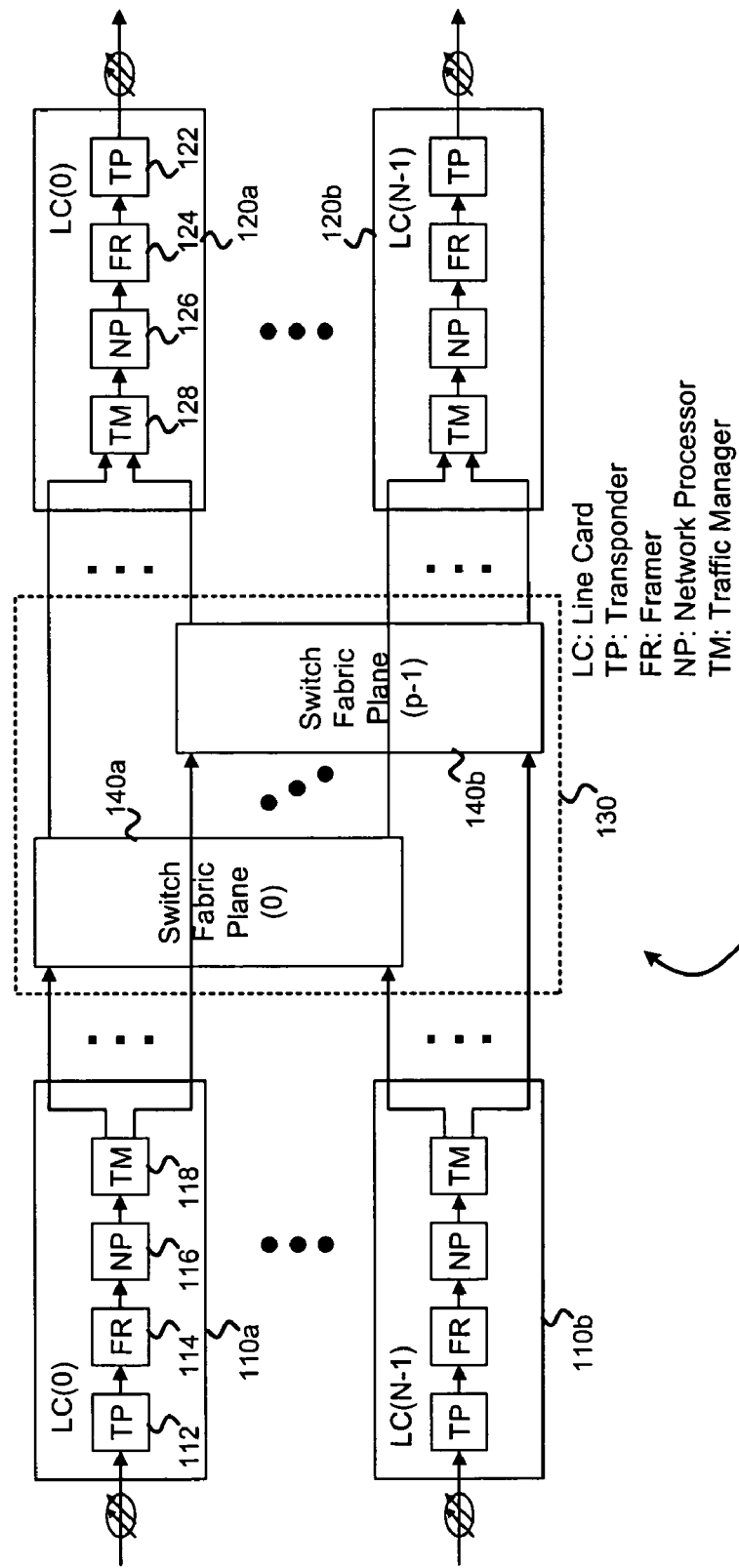
FIG. 1 is a block diagram of an exemplary switch environment in which, or with which, the present invention may be used.
Figure 2:
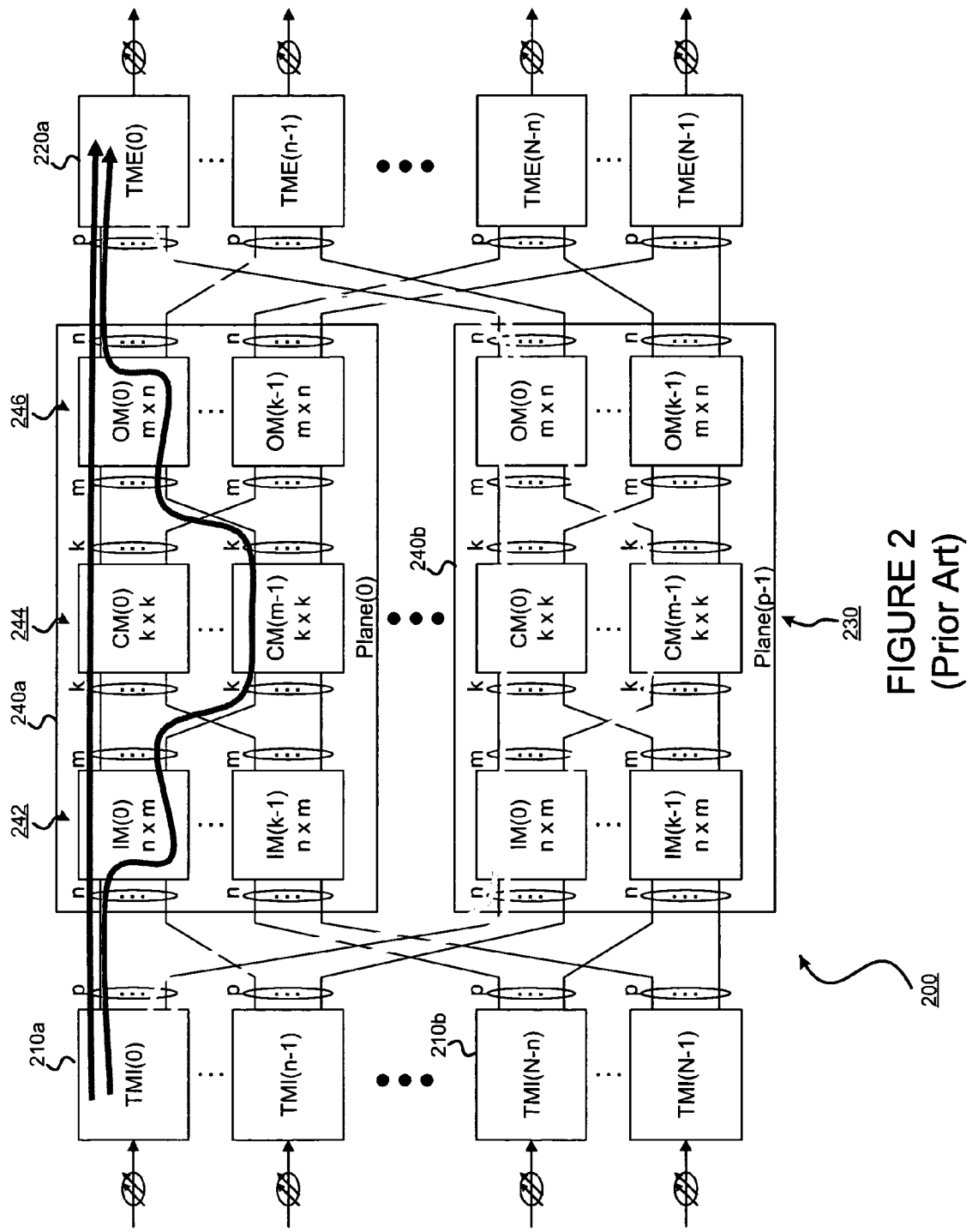
FIG. 2 illustrates alternative paths for a given {input port, output port} pair through a multi-stage switch.

The present invention may involve novel methods, apparatus, message formats, and/or data structures for maintaining packet cell sequence in a switch. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§ 4.1 First Embodiment

The invention may be used to control or limit the potential number of out-of-sequence packet cells using a window flow control scheme. By limiting the potential number of out-of-sequence packet cells, re-sequencing queues at egress modules becomes practical. For each input-output pair, an available cell counter (ACC), which is always equal to or less than a window size, is maintained. If the ACC is greater than 0, the input port (in the specification, the input port and TMI are used interchangeably. In the same way, the output port and the TME are used interchangeably) can send a cell. Each time the input port sends a cell, the ACC is decremented (e.g. by one). If the output port receives a cell in order, it sends an acknowledgement (ACK) message (e.g. packet). When the input port receives the ACK packet, it updates the ACC accordingly.

One way to implement this scheme is described in § 4.1.1 and § 4.1.2 below. The input port maintains an available cell counter (ACC) for each output port. Initially all ACC values are set to a predefined window value W. (Different ways for selecting W are described in § 4.3.1 below.) The input port examines VOQ(s) starting from the current position of a round robin pointer. If the VOQ is not empty and the corresponding ACC value is greater than 0, the input port sends the HOL cell and decrements the ACC value by one. The output port maintains a sequence number (SN) pointer for each input port. The output port examines VIQ(s) starting from the current position of a round robin pointer. If the VIQ has a cell at the position of the SN pointer, it sends an acknowledgement (ACK) to the input port.

§ 4.1.1 Operations at Ingress and Egress

Figure 3:
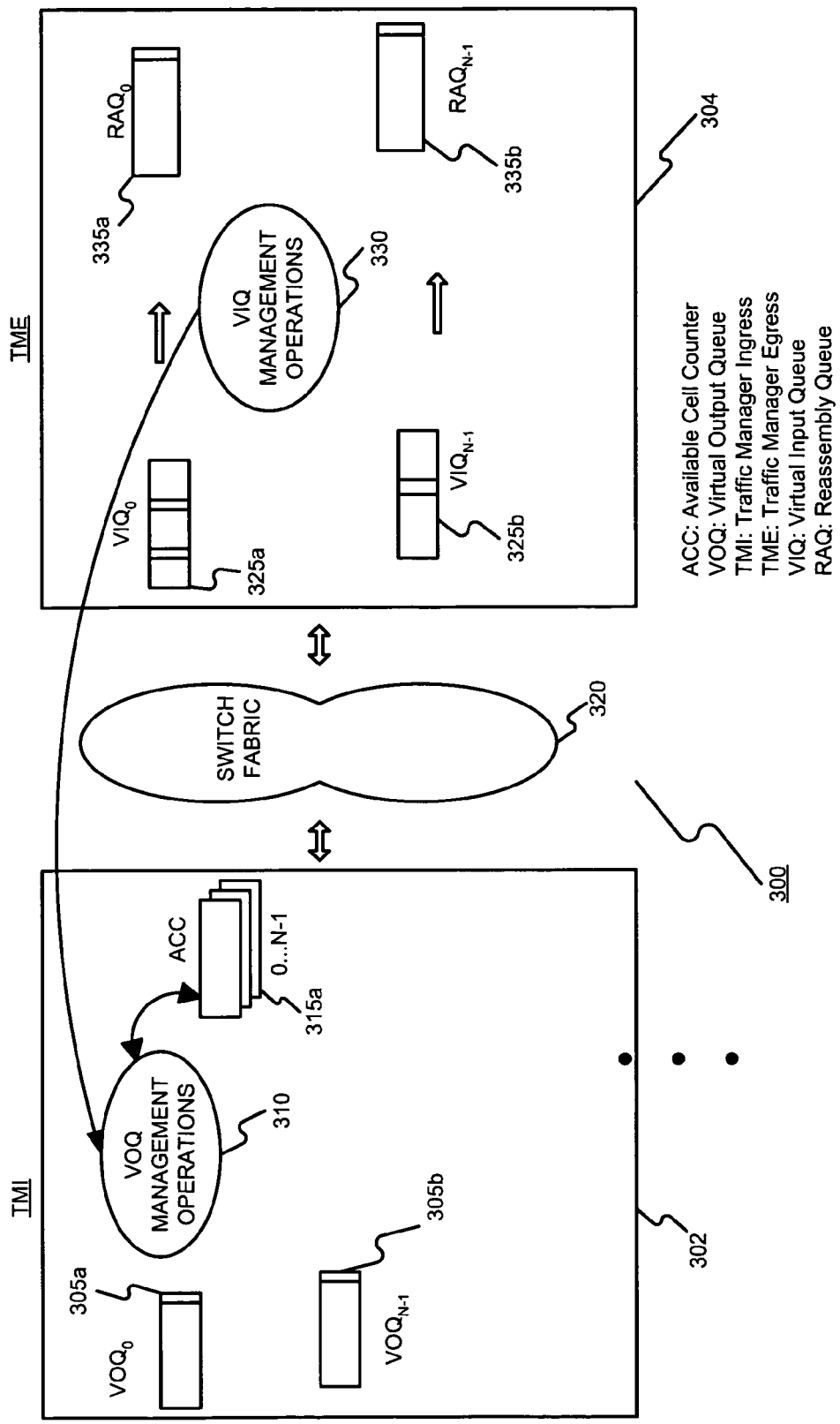
FIG. 3 shows operations that may be performed at an ingress module and an egress module in a first embodiment consistent with the present invention.

FIG. 3 shows operations that may be performed at an ingress module 302 and an egress module 304 in a first embodiment consistent with the present invention. The TMI 302 may include a large number of VOQs 305 (one for each output port). The TMI 302 may also include an ACC 315 for each VOQ 325. VOQ management operations 310 examine each VOQ 305 in a round robin fashion. Once it finds a VOQ 305 that is not empty and has an ACC 315 value greater than zero, it then is able to send the cell to the switch fabric 320 towards the output port. When it sends the cell from a VOQ 305, the value in the associated ACC 315 is decremented (e.g., by one).

The TME 304 temporarily stores the receiving cells in an appropriate one of the VIQs 325. The VIQ management operations 330 examine if the cells are in order by using a SN pointer for each input port. If the cells are in order they are moved from the VIQ 325 to the corresponding RAQ 335 and the VIQ management operations 330 send an acknowledgement (ACK) packet back to the VOQ management operations 310.

§ 4.1.2 Exemplary Methods

Figure 4:
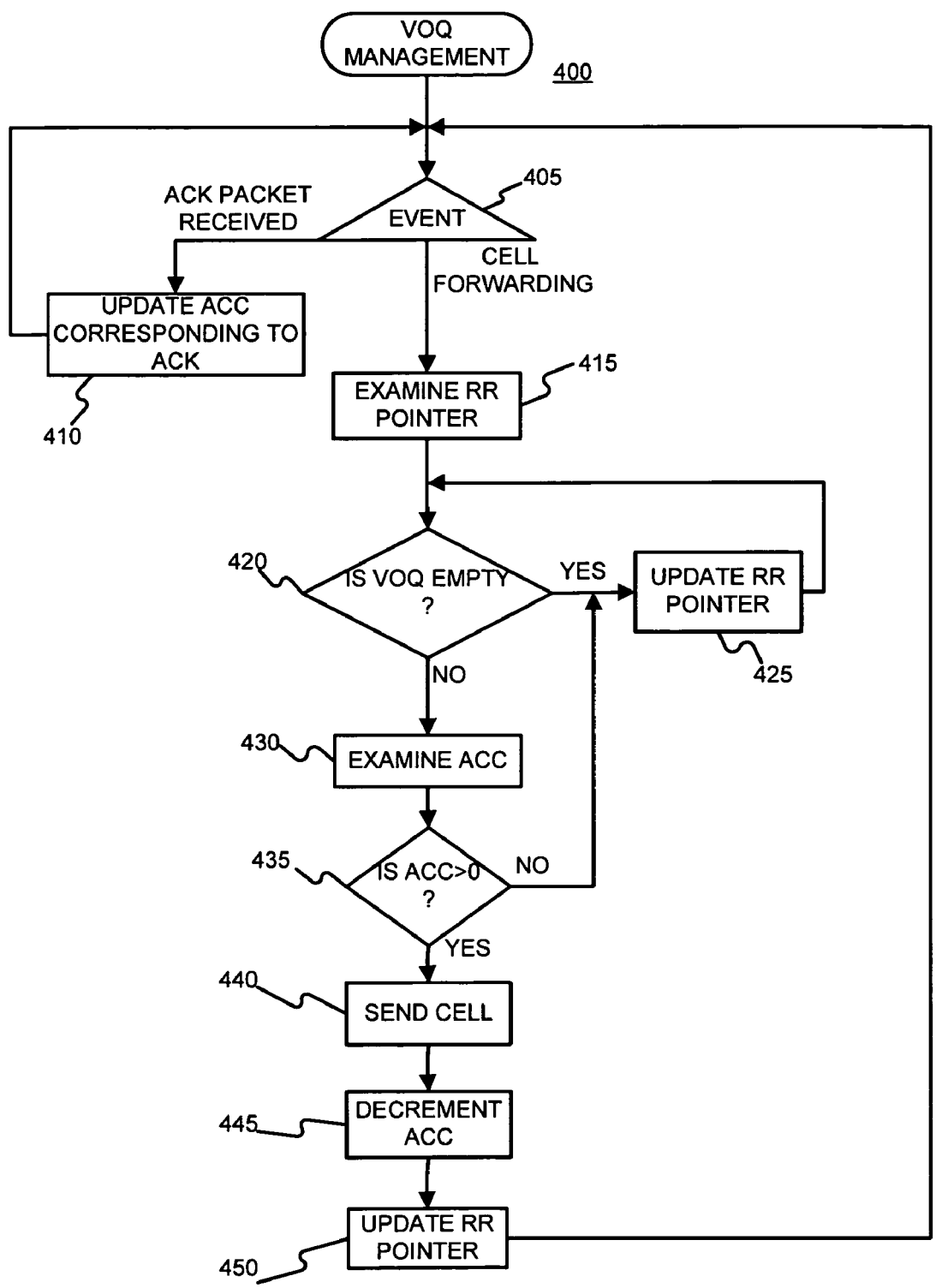
FIG. 4 is a flow diagram of an exemplary method that may be used to perform virtual output queue management in a manner consistent with the first embodiment of the present invention.
Figure 5:
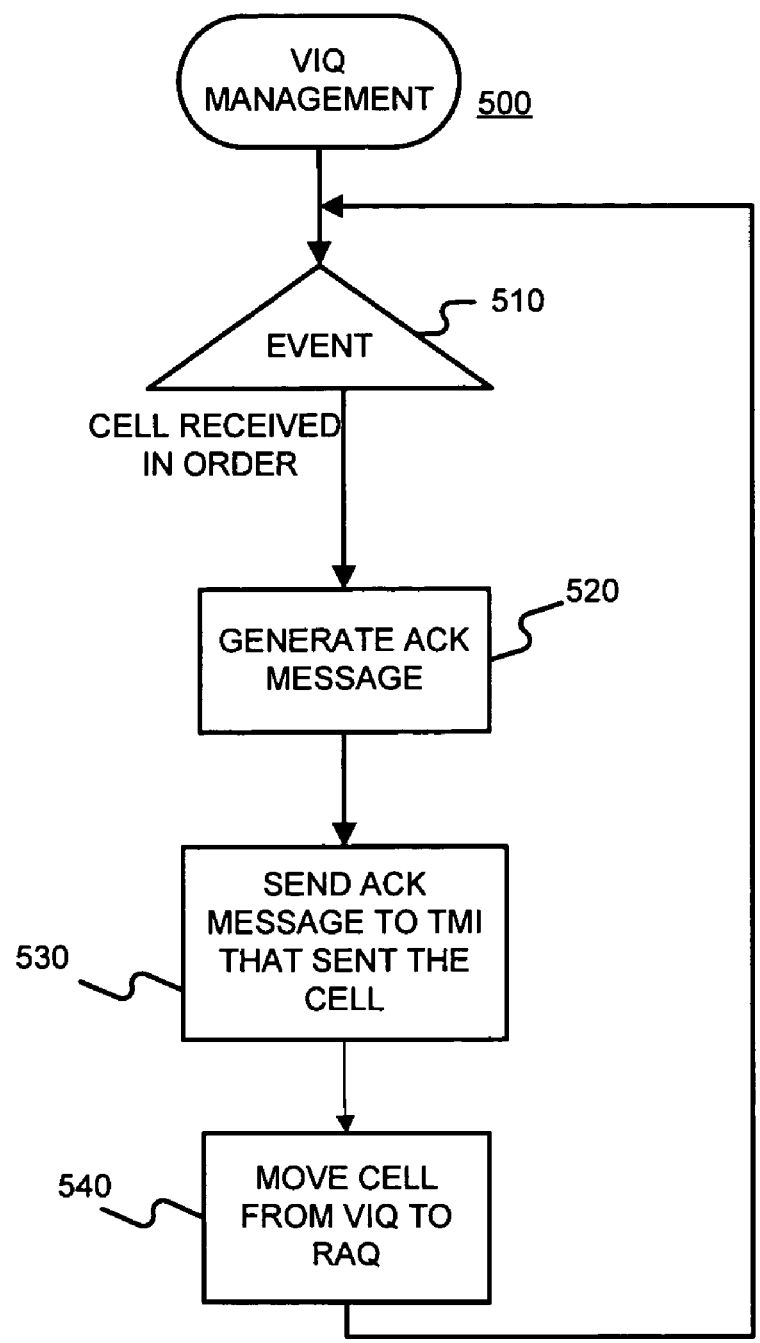
FIG. 5 is a flow diagram of an exemplary method that may be used to perform virtual input queue management in a manner consistent with the first embodiment of the present invention.

FIGS. 4 and 5 are flow charts illustrating exemplary methods 400 and 500 for performing the general actions taken by the VOQ and VIQ management operations respectably.

As shown in FIG. 4, various branches of the method 400 are performed upon the occurrence of various events. (Block 405) For example, if an ACK packet is received, the VOQ manager updates the ACC counter corresponding to the ACK packet (Block 410) and the method 400 returns to block 405. If it is time to forward a cell, the method 400 performs a number of acts. More specifically, the VOQ manager examines the RR pointer to determine which VOQ to process. (Block 415) If the VOQ is empty, it obviously cannot send a cell. Therefore, the RR pointer is updated in order to examine another (e.g., a next) corresponding VOQ. (Blocks 420 and 425) If the VOQ is not empty, then the value of the ACC corresponding to the VOQ is examined. (Block 430) Then, it is determined whether the ACC value is greater than zero or not. (Block 435) If the ACC is greater than zero, it sends a cell (Block 440), decrements the value of the ACC by one (Block 445), and updates the RR pointer (Block 450) before the method 400 returns to block 405. If, on the other hand, the value of the ACC is not greater than zero, it does not send a cell, but simply updates the RR pointer (block 425), before the method 400 branches back to block 420.

In FIG. 5, acts of the method 500 are performed. A cell has been received in order. (Block 510). The VIQ manager may determine this by examining the VIQs. Once a cell has been received in sequence, an ACK message (e.g., packet) is generated (Block 520) and sent to the TMI that sent the cell (Block 530). Then, the cell is moved from the VIQ to the RAQ. (Block 540). These acts may be performed by the VIQ manager.

§ 4.2 Second Embodiment

Proper cell ordering may be maintained using a sequence number (SN) for each flow. The SN ranges from 0 to W-1, where W is the window size. Therefore, in this implementation, the number of cells in the switch fabric for a flow cannot exceed W. If there are N input ports and N output ports, the number of flows is $N^2$. Each input port has N VOQs, one per each output port. Each output port also has N VIQs, one per each input port.

When an input port sends a cell to the switch fabric, it attaches an SN to the cell header. The SN is given by the VOQ manager. The VOQ manager maintains two pointers for each VOQ; a sequence head pointer (SEQ.head) and a sequence tail pointer (SEQ.tail). The SEQ.head is the SN to be attached to the cell sent from the input port. After a cell is sent, the SEQ.head is incremented (e.g., by one).

When an output port receives a cell, it stores the cell in the appropriate VIQ according to its SN. The output port moves a cell from a VIQ to a corresponding reassembly queue (RAQ) only when the VIQ has a cell in order. Since the VIQ can receive cells out-of-order, the output port maintains a sequence pointer (SEQ.ptr) for each VIQ. The SEQ.ptr indicates the SN of the next in-order cell for the VIQ. When a cell arrives at TME with an SN equal to the SEQ.ptr, the cell is moved from the VIQ to the corresponding RAQ, and the SEQ.ptr is incremented (e.g., by one) If the SEQ.ptr is a multiple of P (i.e., the number of switch planes), the output port sends an acknowledgement (ACK) packet with the SN of SEQ.ptr.

When an input port receives an ACK packet, it updates its SEQ.tail pointer. More specifically, if the SN in the ACK packet is in an eligible range (described below), the SEQ.tail is updated to the SN in the ACK packet. If the SN in the ACK packet is not in the eligible range, the SEQ.tail is not updated.

If the three pointers (SEQ.head, SEQ.tail, and SEQ.ptr) are updated as described above, the three pointers will always be within the eligible range.

§ 4.2.1 Operations at Ingress and Egress

Figure 6:
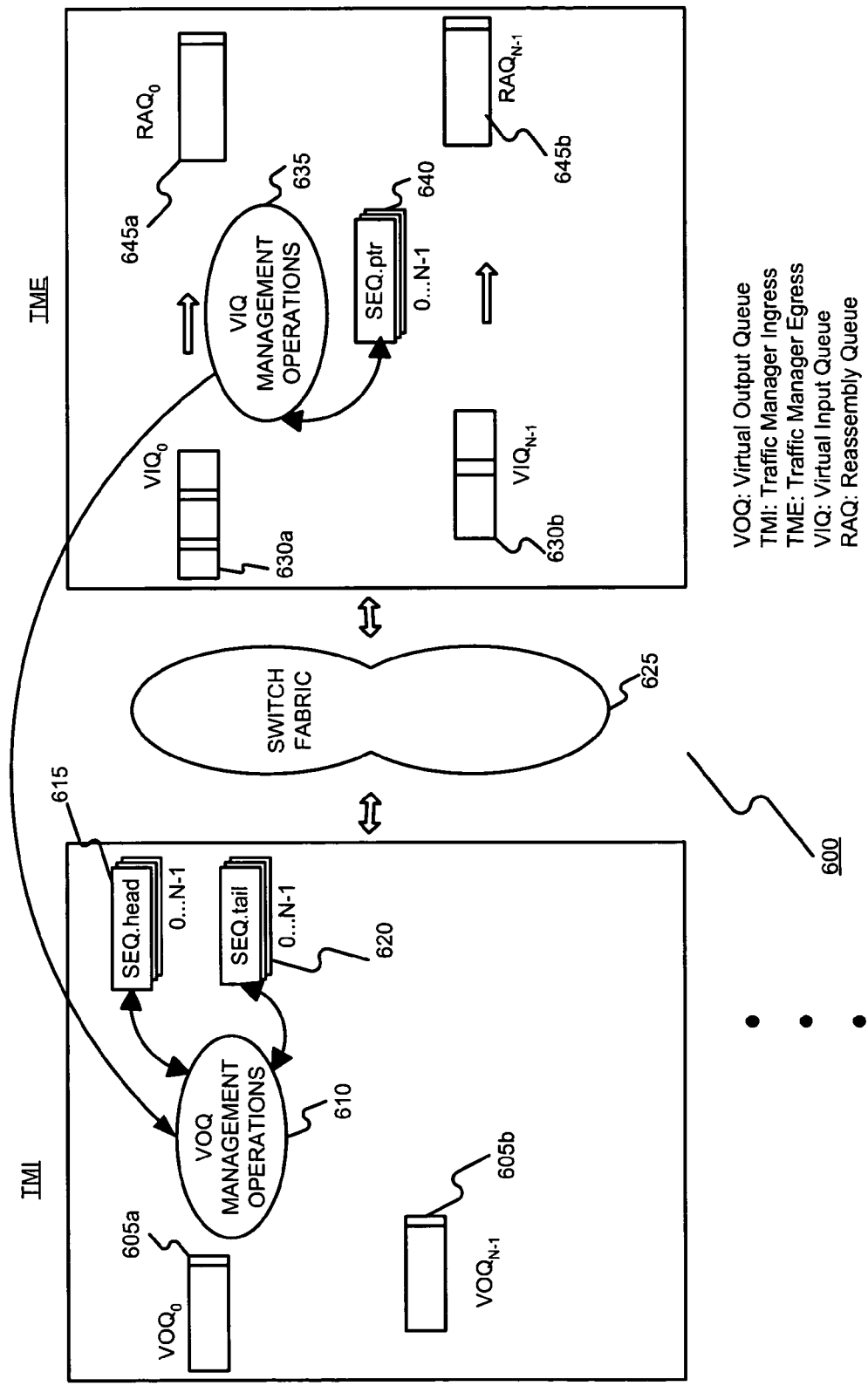
FIG. 6 shows operations that may be performed at an ingress module and an egress module in a second embodiment consistent with the present invention.

FIG. 6 shows operations that may be performed at an ingress module and an egress module in a second embodiment consistent with the present invention. Each VOQ 605a-605b at the TMI has its own sequence head pointer 615 and sequence tail pointers 620 maintained by the VOQ management operations 610. Every time a cell is sent from the TMI, the VOQ management operations 610 attach a sequence number (SN), which is equal to the value of the sequence head pointer 615 (SEQ.head), to the cell head. After the cell has been sent, the VOQ management operations 610 increments the sequence head pointer 615 (SEQ.head) by one.

On the receiving side of the switch fabric at the TME, each VIQ 630 at the TME has its own sequence pointer 640 (SEQ.ptr) maintained by the VIQ management operations 635. The sequence pointer 640 (SEQ.ptr) indicates the next in-order cell for which the VIQ waits. In essence, the sequence pointers 640 (SEQ.ptr) act as SN pointers. Each received cell at the TME is stored in the appropriate VIQ 630 at a location according to its SN, which is equal to the value of the sequence head pointer 615 (SEQ.head) at the time the cell was sent from the TMI. More specifically, the write address of the VIQ 630 is, or is based on, the SN of the received cell. The read address of the VIQ is, or is based on, the value of the SN pointer, or strictly speaking the value of the sequence pointer 640 (SEQ.ptr).

Initially the SN pointer is set to 1 and incremented by one whenever the VIQ 630 is read. This means that, initially, the VOQ management operations 635 will send the cell with a SN equal to 1. (In one exemplary embodiment consistent with the present invention, an SN is given to a cell when it departs the input port. Therefore, in such an embodiment, the cells in VOQ do not have an SN.) The VIQ 630 is read only when there is a valid cell at the read address. The VIQ 630 is not a FIFO because the cells may not arrive in the order of their SN. If the arriving cell is in order it will be moved from the VIQ 630 to the corresponding RAQ 645 and the SEQ.ptr will be incremented (e.g., by one). If the cell is not in order, the VIQ management operations 635 will wait for the cell that has an SN equal to the number indicated by the SEQ.ptr to be written to the VIQ 630. Once that cell arrives, it will be moved from the VIQ 630 to the corresponding RAQ 645 and the process continues in a similar fashion. If the value of the sequence pointer 640 (SEQ.ptr) is a multiple of P (i.e., the number of switch planes), the VIQ management operations 635 send an ACK message (e.g., packet) with a SN equal to the value of the sequence pointer (SEQ.ptr) back to the VOQ management operations 610. This will significantly reduce the traffic load of ACK packets, compared with the first embodiment, by a factor of P. Upon receipt of the ACK message, the VOQ management operations 610 update the sequence tail pointer 620 (SEQ.tail) accordingly if the ACK packet is in the eligible range.

§ 4.2.2 Exemplary Methods

Figure 7:
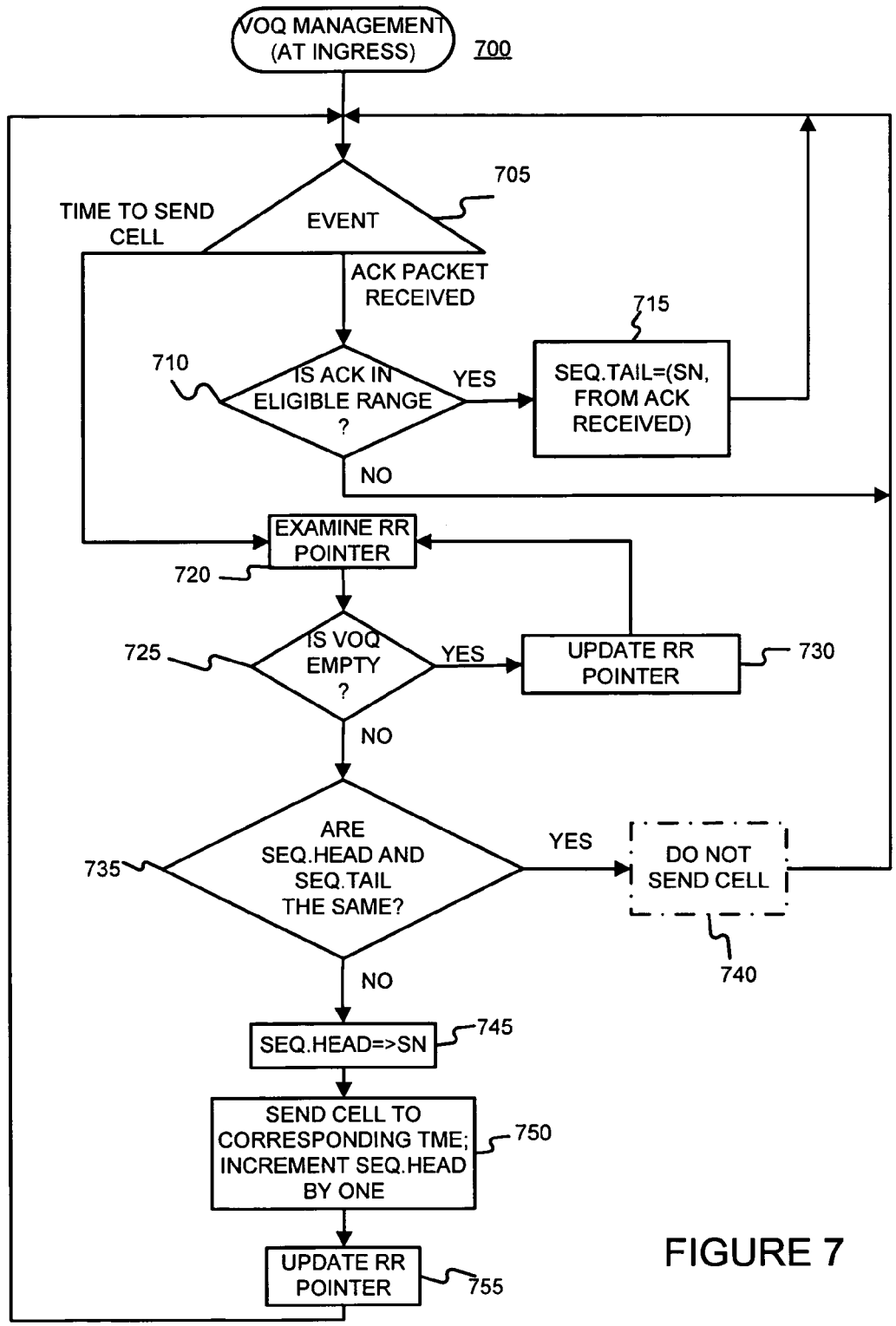
FIG. 7 is a flow diagram of an exemplary method that may be used to perform virtual output queue management in a manner consistent with the second embodiment of the present invention.

FIG. 7 is a flow diagram of an exemplary method 700 that may be used to perform virtual output queue management operations 610 in a manner consistent with the second embodiment of the present invention. The method 700 may be performed by a VOQ manager at a TMI.

As shown by event block 705, different acts of the method 700 are performed in response to different events. Two events can occur at event block 705; either an ACK packet has been received or it is time to send a cell. If an ACK packet has been received (Block 705), the method 700 will proceed to examine if the ACK packet is in the eligible range (Block 710). If the ACK packet is in the eligible range (Block 710), the value of the sequence tail pointer (SEQ.tail) is set to the value of the SN included in the ACK packet (Block 715) and the method 700 branches back to block 705. Referring back to decision block 710, if the ACK packet is not in the eligible range, the method 700 branches back to block 705 without performing any acts. (In at least one exemplary embodiment consistent with the present invention, the two events (ACK packet arrival and new cell transmission) may occur at the same time, and the two events are managed independently at the same time. In such an embodiment, there is no need to wait until the other event is managed.

The method then checks the VOQs in accordance with a RR pointer. Specifically, the VOQ manager examines the RR pointer (Block 720) and proceeds to examine the associated VOQ. If the VOQ is empty (Block 725), the VOQ manager will simply update the RR pointer (Block 730) and examine another VOQ. If the VOQ is not empty (Block 725), the VOQ manager will check to see if the values of the SEQ.head and SEQ.tail are the same or not. In the second embodiment, the input port doesn't maintain ACC at all. Instead, the ACC value can be derived from the values of SEQ.head and SEQ.tail. Note that the ACC is equal to zero if the value of SEQ.head is the same as that of SEQ.tail. Therefore, the ACC can be updated in two ways: first, by incrementing the value of the sequence head pointer (SEQ.head) by one every time a cell is sent, which is equivalent to decrementing the value of ACC by one every time a cell is sent; and second, by updating the value of the sequence tail pointer (SEQ.tail) to the value of the SN of the ACK received, which is equivalent to incrementing the value of the ACC accordingly. If the value of the ACC is found to be greater than zero, method 700 sets the value of the sequence head pointer (SEQ.head) to the SN of the cell to be sent (Block 745), sends the cell to the corresponding output port (Block 750), updates the value of the sequence head pointer (SEQ.head) (e.g., by incrementing it by one) (Block 750), and updates the RR pointer (Block 755) before the method 700 branches back to block 705. Referring back to decision block 735, if the values of the SEQ.head and SEQ.tail are the same (Block 735), the method does not send the cell (Block 740). Instead, the method 700 branches back to block 705.

Referring back to event block 705, if it is time to send a cell, the method 700 attempts to send a cell by branching to block 720 already described above.

Note that the method 700 does not necessarily receive an ACK packet for every cell it sends. The VIQ manager may send ACK packets to the VOQ manager whenever the sequence pointer (SEQ.ptr) of the VIQ manager is a multiple of the number (P) of switch planes.

Figure 8:
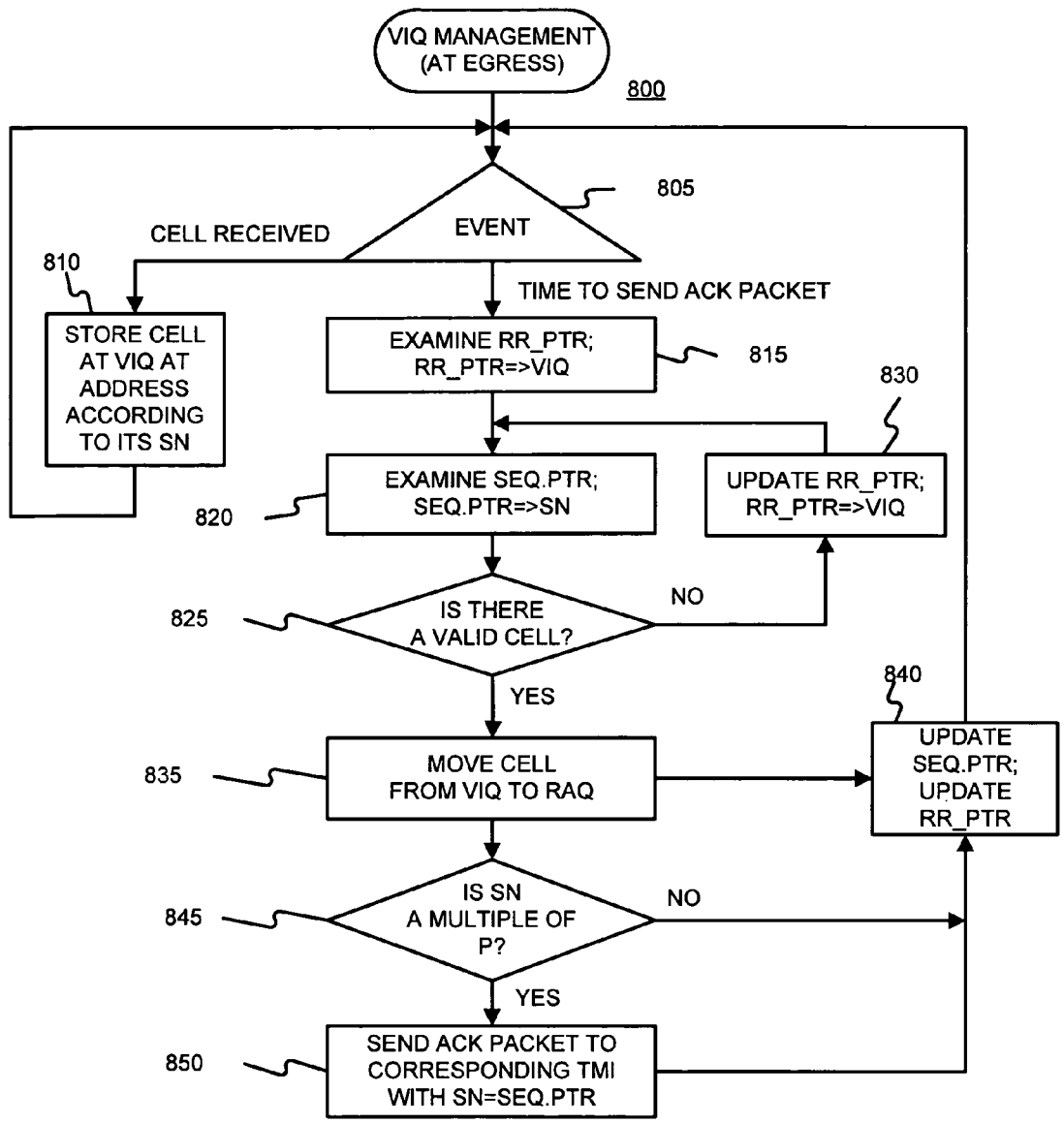
FIG. 8 is a flow diagram of an exemplary method that may be used to perform virtual input queue management in a manner consistent with the second embodiment of the present invention.
Figure 9A:
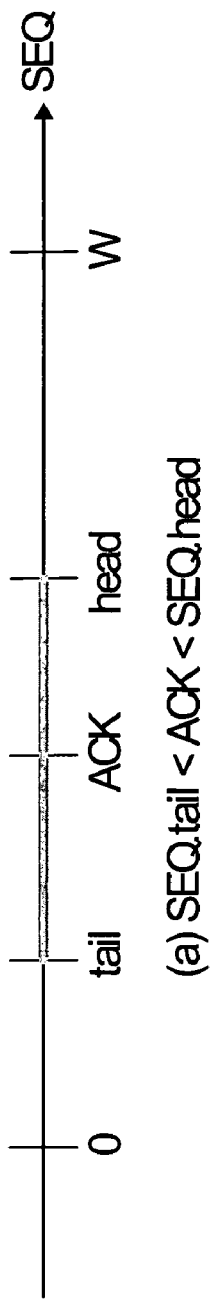
FIGS. 9A-9C are sequence diagrams illustrating examples of ACK messages in an eligible range.
Figure 9B:
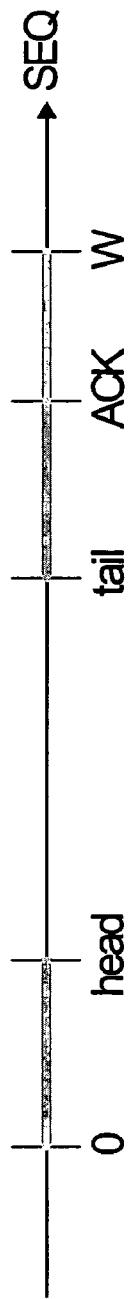
Figure 9C:
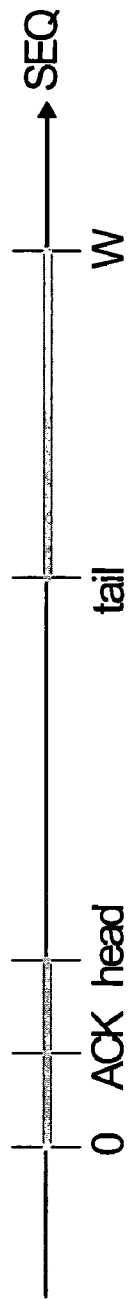

FIG. 8 is a flow diagram of an exemplary method 800 that may be used to perform virtual input queue management in a manner consistent with the second embodiment of the present invention. The method 800 may be performed by a VIQ manager at a TME.

As shown by event block 805, different acts of the method 800 may be performed in response to different events. Two events can occur at event block 805; either a cell has been received, or it is time to send an ACK packet. If a cell has been received, the method 800 stores the cell at VIQ with the address determined by the input port number and the SN in the cell header. (Block 810) The method 800 then checks the VIQs in accordance with a RR pointer. Specifically, the VIQ manager examines the RR pointer (Block 815), which is the VIQ number, and the method 800 gets the sequence pointer (SEQ.PTR) associated with the VIQ. Then the method 800 proceeds to examine the VIQ at the address indicated by the SEQ.PTR. (Block 820) If the VIQ is empty (Block 825), the VIQ manager simply updates the RR pointer (Block 830) and examines another VIQ.

If, on the other hand, there is a valid cell in the VIQ at the address indicated by the SEQ.PTR (Block 825), the method 800 moves the cell from the VIQ to the Reassembly Queue (RAQ) (Block 835), and the method 800 branches back to block 805 after updating its RR pointer (Block 840). When a cell is moved from the VIQ to the RAQ, the value of the sequence pointer (SEQ.ptr) is updated (e.g., incremented by one). (Block 840).

Afterward, it is examined whether the SEQ.ptr is a multiple of P (P=numbers of planes). (Block 845) If the value of the sequence pointer (SEQ.ptr) is a multiple of P, the VIQ manager generates an ACK packet and sends it to the cell's TMI with an SN equal to the value of the sequence pointer (SEQ.ptr) (Block 850), the RR pointer is updated (Block 810), and the method 800 resumes at block 805. Otherwise, the method 800 simply branches back to block 805 after updating its RR pointer (Block 810).

§ 4.3 Alternatives and Refinements

Various refinements of particular embodiments consistent with the present invention, as well as alternative embodiments, are provided below.

§ 4.3.1 Techniques for Determining a Window Size

In order to ensure 100% throughput, the window size W must be equal to or greater than the round-trip time (RTT) in the unit of time slot, multiplied by the number of cells transmitted by the input port at each time slot, where the time slot is the time to transmit one cell. Note that an input port can send up to P cells at each time slot, where P is the number of switch planes. For example, if the RTT is 24 time slots and the number of cells transmitted by the input port in a time slot is 8, the W must be at least 192 cells in order to ensure 100% throughput.

The RTT is composed of the propagation time between the input port and the output port, and the queuing time at the switch fabric. The propagation time is deterministic and fixed because it is proportional to the distance between the input port and the output port. If the switch fabric has a multi-stage architecture, the propagation time between the input port and the output port is the sum of the propagation times between the input port and IM, IM and CM, CM and OM, and OM and the output port.

For example, if the link speed is 2.5 Gbps and the cell size is 64 bytes (i.e., 512 bits), the time slot is 204.8 nsec, which is equivalent to the propagation time of 41 m (204.8 nsec*$2\times10^8$ m/s). Assume that TMIs, TMEs, IMs and OMs are on the same shelf while CMs are at other shelf which can be separated up to 120 m. Then the propagation time between TMI and IM will be less than one time slot because the distance between TMI and IM will less than 20 m (i.e., 41 m/2 for round trip). However, an additional time may be necessary because cells from different TMIs may arbitrarily arrive at IM within a time slot. Therefore, it is assumed that the propagation time between TMI and IM is 2 time slots. In the same way, it is assumed that the propagation time between OM and TME is 2 time slots.

If the distance between IM and CM is 120 m, the propagation delay is 600 nsec (i.e., 120 m/$2\times10^8$ m/s), which is equivalent to three (3) time slots. Then the propagation time between IM and CM is six (6) time slots. However, if the arrival times from different IMs to an CM is considered, two more time slots need to be added. Therefore, it is assumed that the propagation time between IM and CM is eight (8) time slots. In the same way, the propagation time between CM and OM is assumed to be 8 time slots. Then the propagation time between the input port and the output port is 24 time slots.

If the switch fabric is not congested, the queuing time at the switch fabric will be negligible and the RTT is close to the propagation time. If the queuing time is less than eight (8) time slots and the propagation time is 24 time slots, the RTT is less than 32 time slots. In such a case, setting the window size W at 256 cells should be adequate. Note that the queuing time is the sum of the queuing delay of the forward direction from the input port to the output port for the delivery of the data cells, and that of the reverse direction from the output port to the input port for the delivery of the ACK packets.

§ 4.3.2 Delivery of ACK

Figure 10:
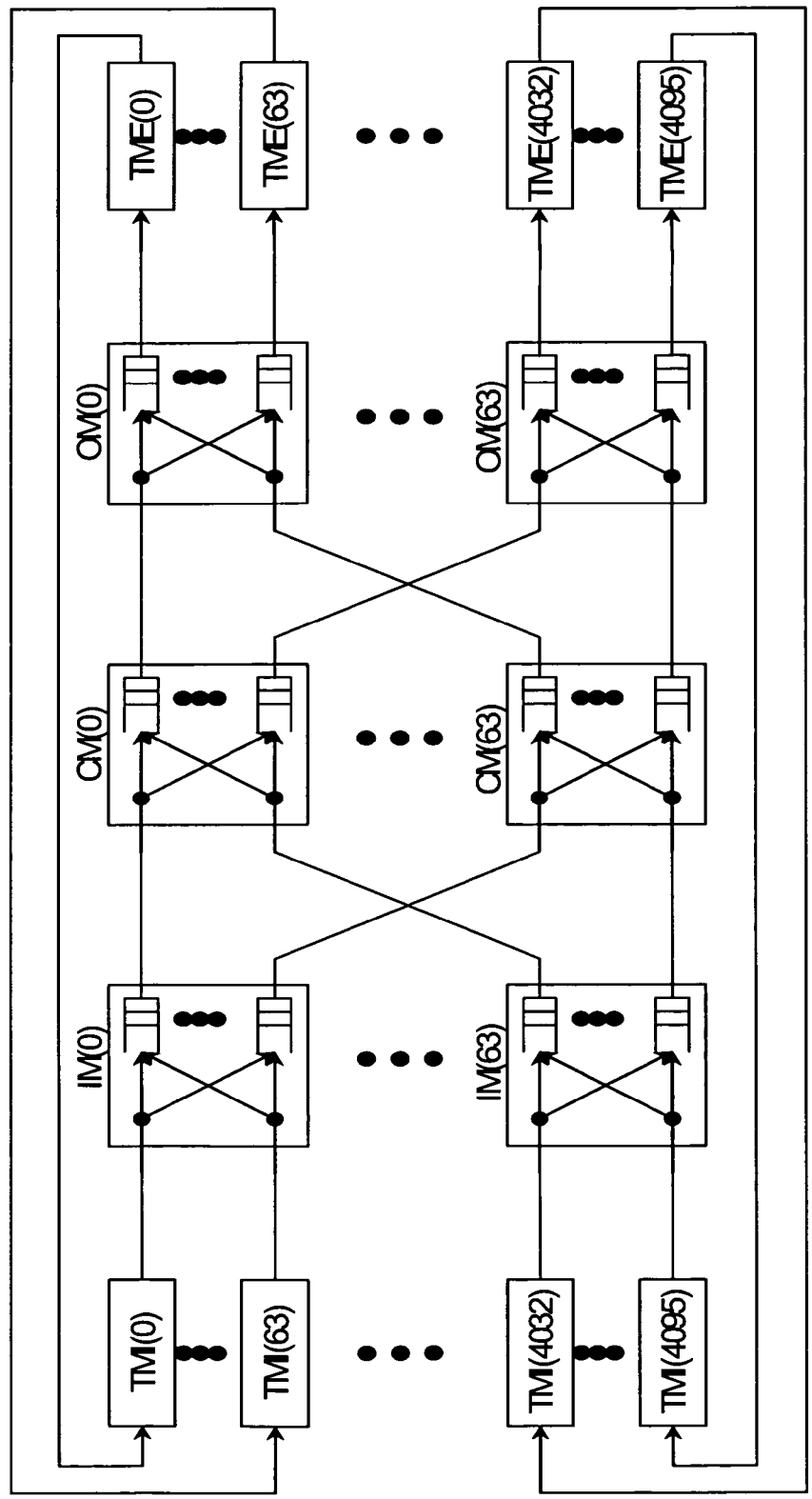
FIG. 10 illustrates an exemplary route for an ACK packet to be delivered from an egress module to an ingress module of a switch.

FIG. 10 illustrates an exemplary route for an ACK packet to be delivered from an egress module to an ingress module of a switch.

The ACK packet can be included in one or more cell headers. The ACK packet should contain at least three (3) fields: the output port address, the input port address, and the SN. The input port address is the destination of the ACK packet. The ACK packet can be delivered as follows. The source TME passes the ACK packet to the source TMI. Note that the source TME and source TMI may be on the same line card as the destination TMI and destination TME may be one the same line card. If the destination TMI is equal to the source TMI, the delivery is done. Otherwise, the source TMI sends the ACK to the switch fabric using the cell header to the destination TME. The destination TME passes the ACK packet to the destination TMI, which is the destination of the ACK packet. The destination TMI updates its ACC (or SEQ.tail) according to the SN in the ACK packet.

The ACK packet doesn't need to be generated for every cell. If the ACK packet is generated for every cell, the switch fabric may not be able to deliver all the ACKs on time because of the contention among the ACKs with the same destination. One possible solution is to generate ACK packets for every P cells, where P is the number of planes in the switch fabric. This solution should ease congestion in the switch fabric in the backward direction.

§ 4.3.3 Multi-Plane Case

This invention is not limited to a single plane switch. It can be applied to a switch fabric including a number of switch planes. In such cases, as mentioned earlier, in one embodiment consistent with the present invention, the VIQ manager sends ACK packets to the VOQ manager only when the value of the sequence pointer (SEQ.ptr) is a multiple of the number of switch planes. For instance, if the switch has eight (8) switch planes, the VIQ manager sends an ACK packet in every 8th cell.

§ 4.4 Performance

The performance of an exemplary switch, consistent with the present invention, will be described below based on different setups of traffic distributions from the input port to the output port.

§ 4.4.1 Delay Performance

The performance of the exemplary switch has been investigated by intensive computer simulations. The simulated switch size has 64 inputs and 64 outputs. The switch fabric is a three stage buffered crossbar, and each module has 8 inputs and 8 outputs. The internal line speed is 1.6 times of the external line speed and the propagation delay from TMI to TME is 12 time slots.

Figure 11:
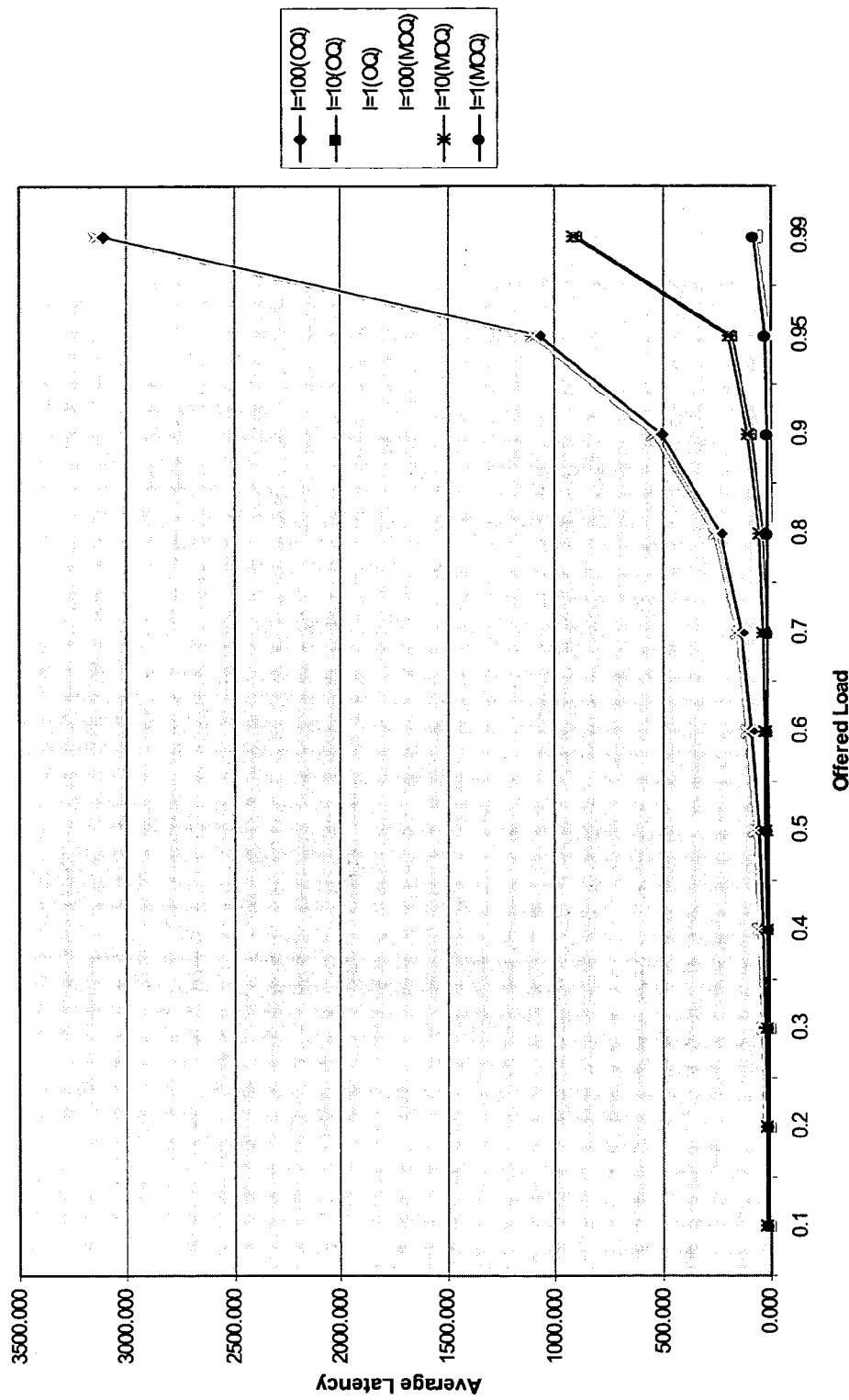
FIG. 11 is a chart depicting delay performance of one embodiment consistent with the present invention under bursty traffic.

FIG. 11 is a chart depicting delay performance of one embodiment consistent with the present invention under bursty traffic.

The delay performance of the proposed scheme under bursty traffic is compared with the optimal output-buffered switch (OQ). The packet size is assumed to be geometrically distributed with the average packet size of 1. Three (3) sets of traffic patterns are shown (l=1, l=10, and l=100). As shown in the FIG. 11, the delay in the switch fabric is very small. The worst case average queuing delay observed in the switch fabric, VOQ and VIQ was 21 time slots (i.e., approximately 4.3 usec if one time slot is 204.8 nsec) when l=100 and the offered load was 99%.

Figure 12:
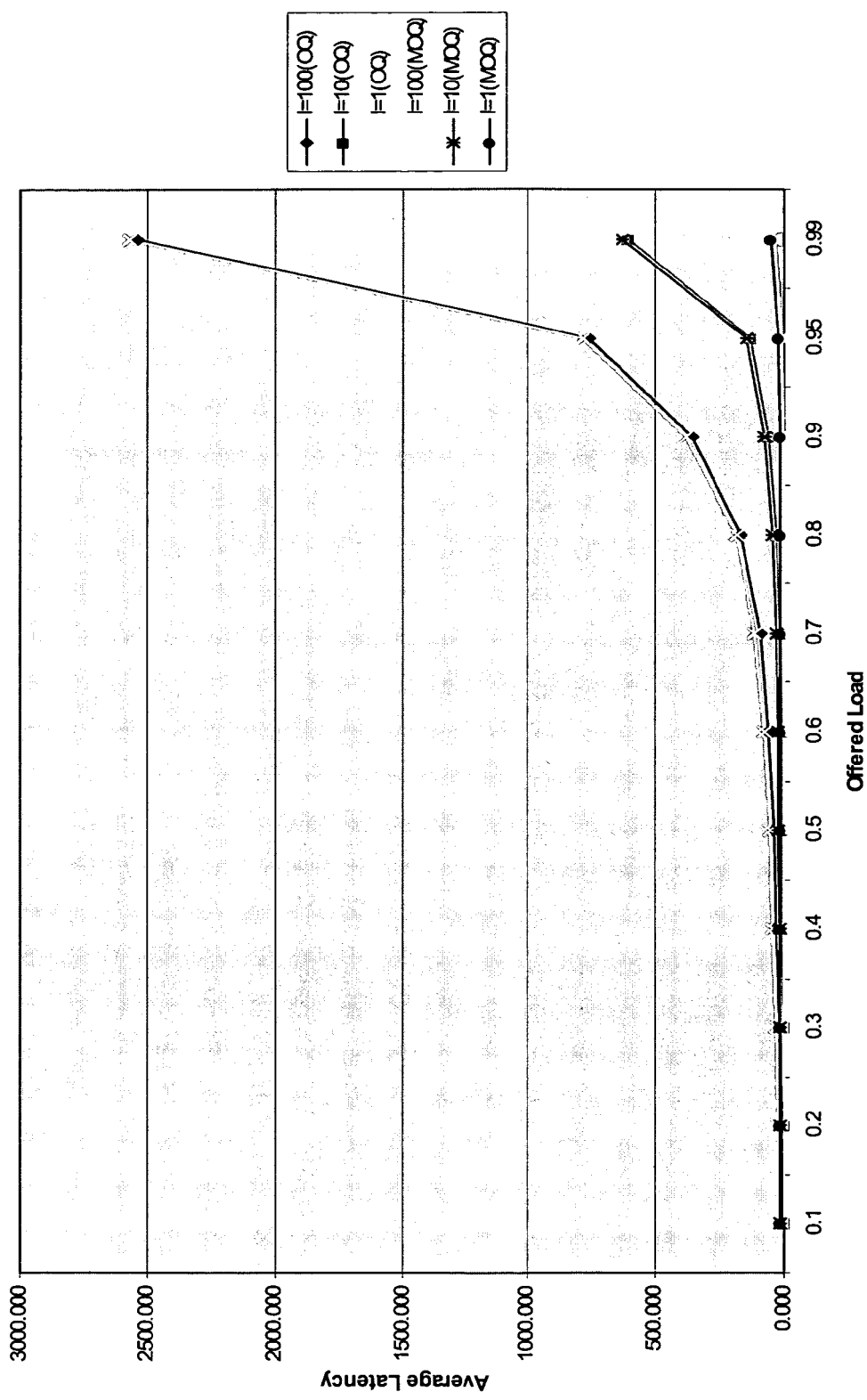
FIG. 12 is a chart depicting delay performance of one embodiment consistent with the present invention under non-uniform traffic.
Figure 13A:
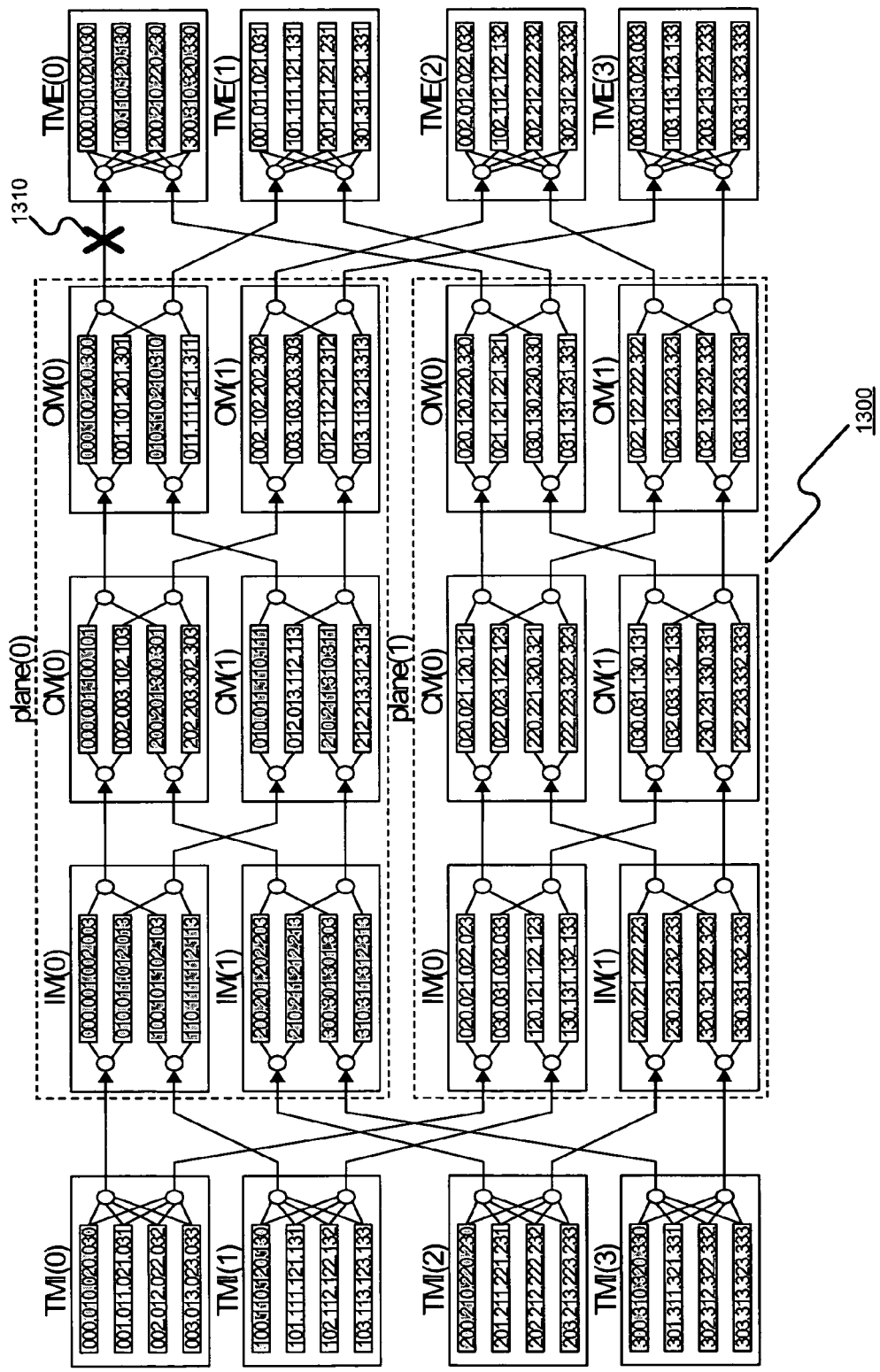
FIGS. 13A-13D illustrate a recovery of the invention to possible link failures between modules and ingress and egress traffic managers.
Figure 13B:
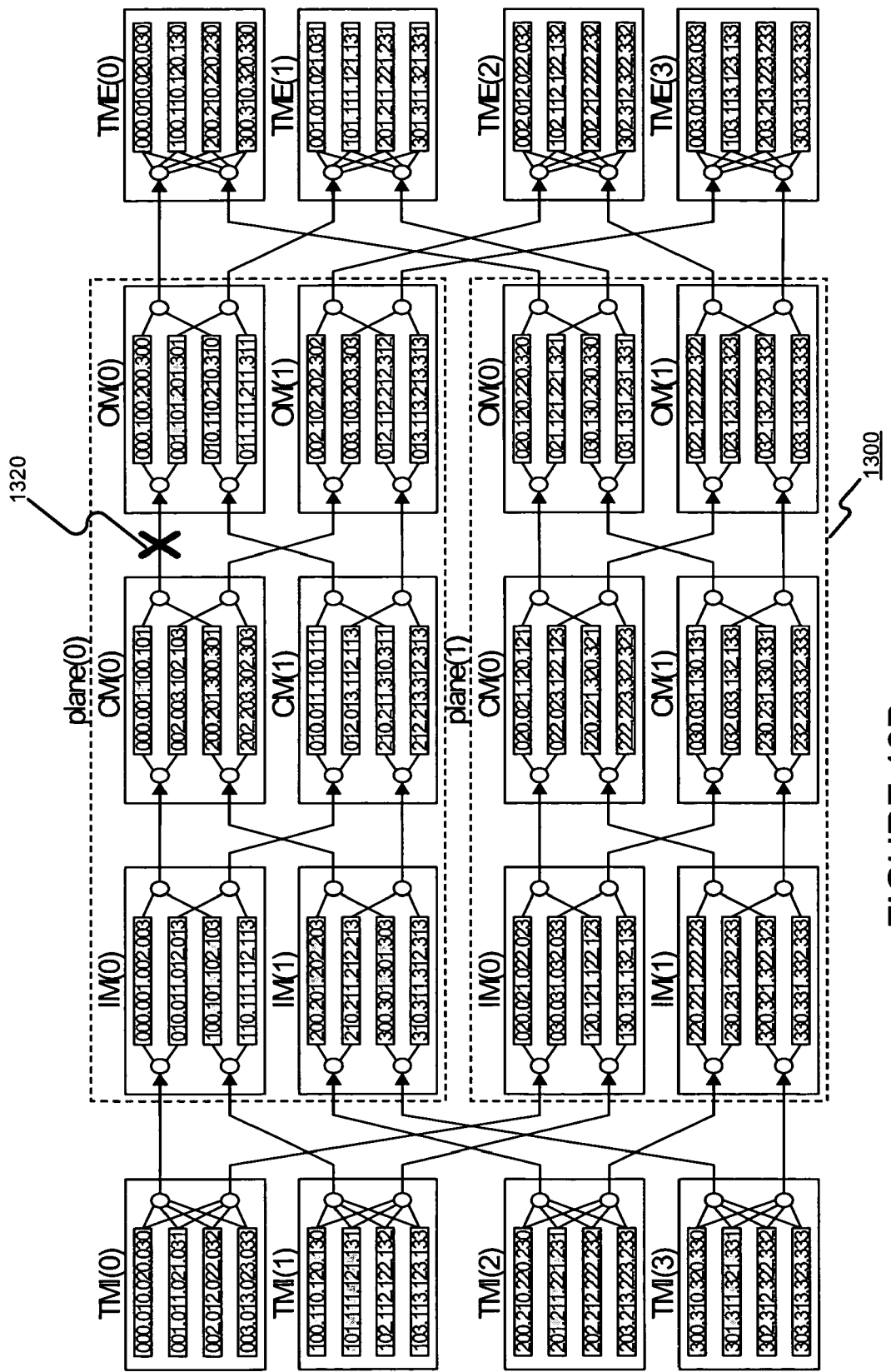
Figure 13C:
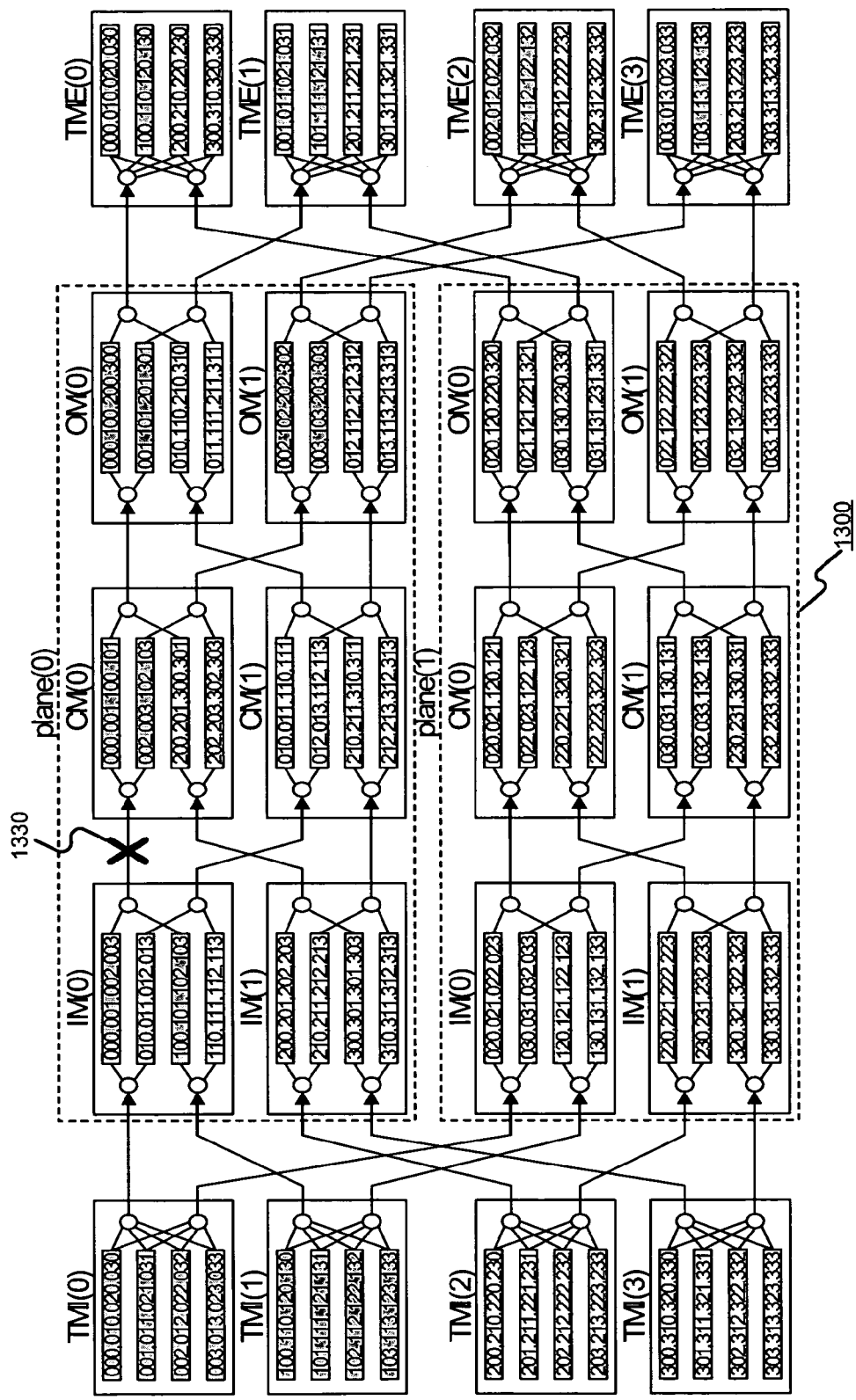
Figure 13D:
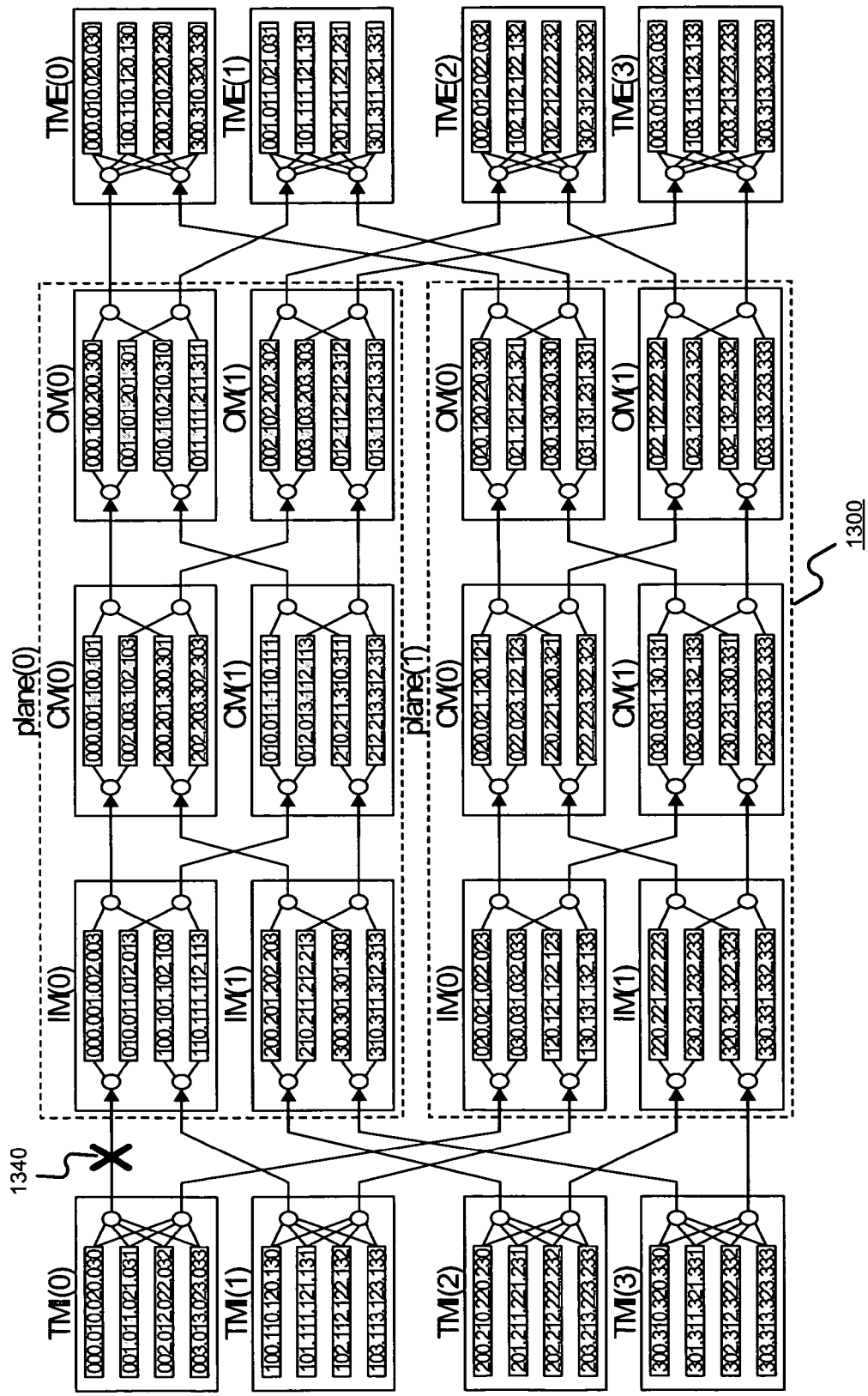

FIG. 12 is a chart depicting delay performance of the exemplary switch under non-uniform traffic. The non-uniform parameter u is defined as below. If u=0.0, all traffic is uniformly distributed over all destination output ports. If u=1.0, all traffic from input port i is destined for its own output port i, which is the same as the circuit switching. If u=0.5, 50% of the traffic from input port i is destined for its own output port i and the other 50% is uniformly distributed over all output ports. As shown in FIG. 12, the delay in the switch fabric is very small. The worst case average queuing delay observed in the switch fabric, VOQ and VIQ was 14 time slots when l=100 and the offered load is 99%.

§ 4.4.2 Fault Tolerance

FIGS. 13A-13D illustrate a recovery of the invention to possible link failures between modules and ingress and egress traffic managers.

In a real system, a link or a component can have a fault. This section describes ways to detect, isolate, and recover the fault in a manner consistent with the present invention. A link failure can be detected by a receiving module of the link if there is a loss of signal (LOS), loss of frame (LOF), loss of light (LOL), or consecutive cyclic redundancy check (CRC) errors. If a receiving module detects a fault, it sends a link fault packet to all TMIs through an Ethernet interface. The link fault packet should identify the link. If there are 4096× 8×4 links (i.e., 4096 ports, 8 planes, 4 stages), a 17-bit link ID may be used.

When a TMI receives the link fault packet, it examines which VOQs are affected by the fault. FIGS. 13A, 13B, 13C, and 13D show all positions of possible link failure (1310, 1320, 1330, and 1340) along with the affected flows by the link failures. The shaded blocks indicate that they are affected by the link failure.

Once the TMI identifies the affected flows, it sends flush packets to all affected TMEs through all paths. The flush packet flushes the associated VIQs at TME. If the TME receives a flush packet, it sends a flush ACK packet. If the TMI receives a flush ACK packet, it resumes the packet transmission over all links including the failed link because the failure has been recovered.

Figure 14A:
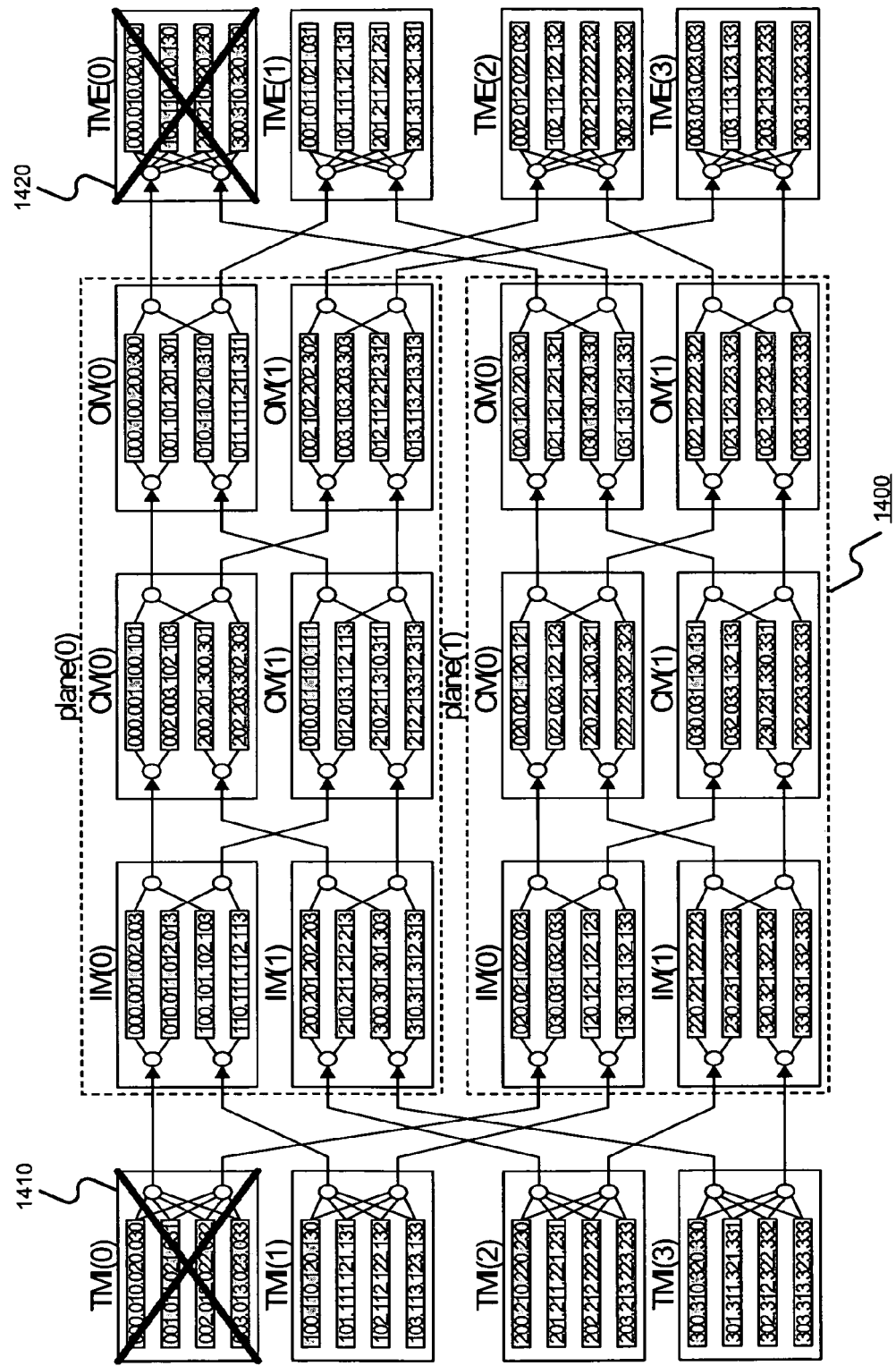
FIGS. 14A-14C illustrate a recovery of the invention to possible switch component failures.
Figure 14B:
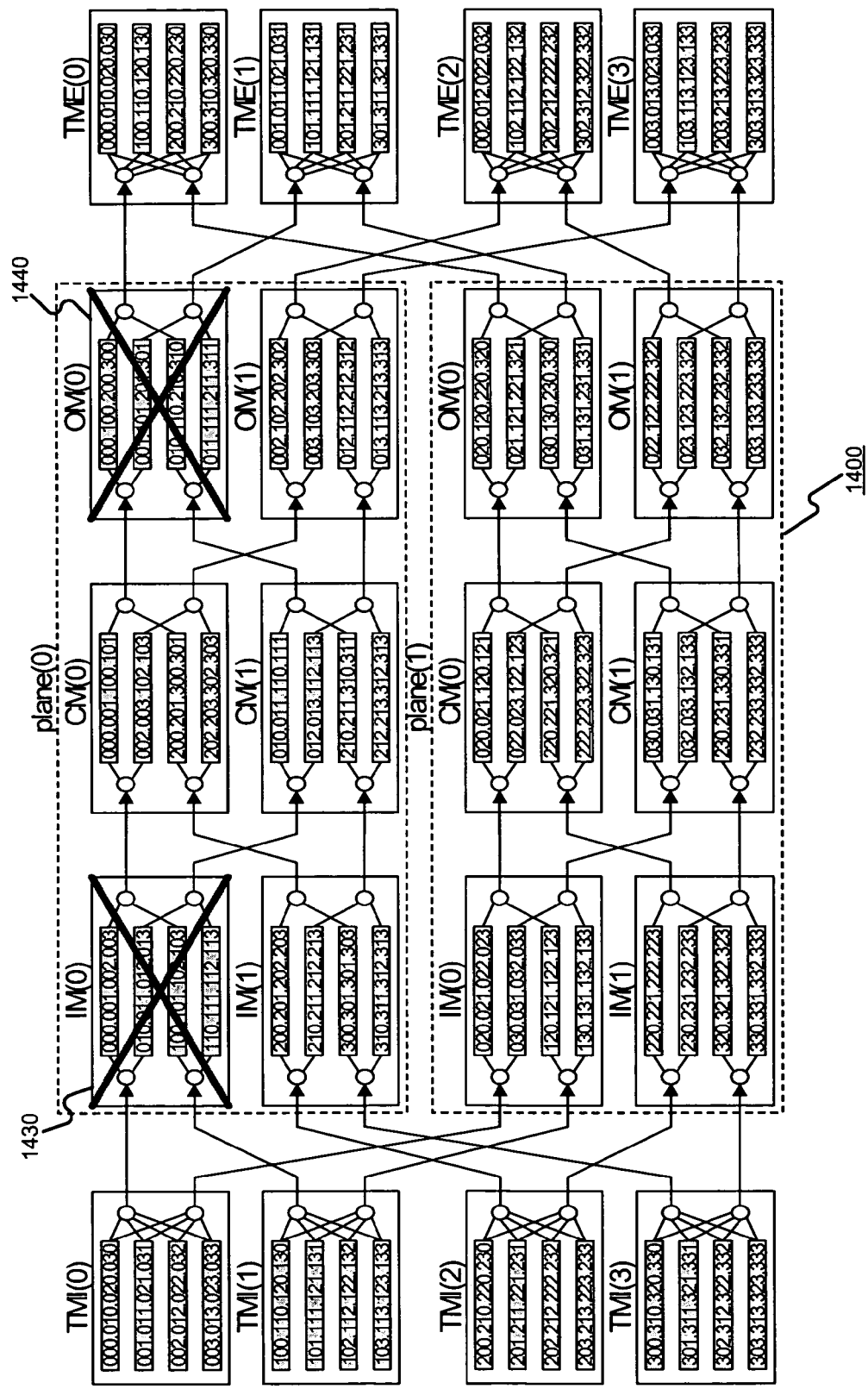
Figure 14C:
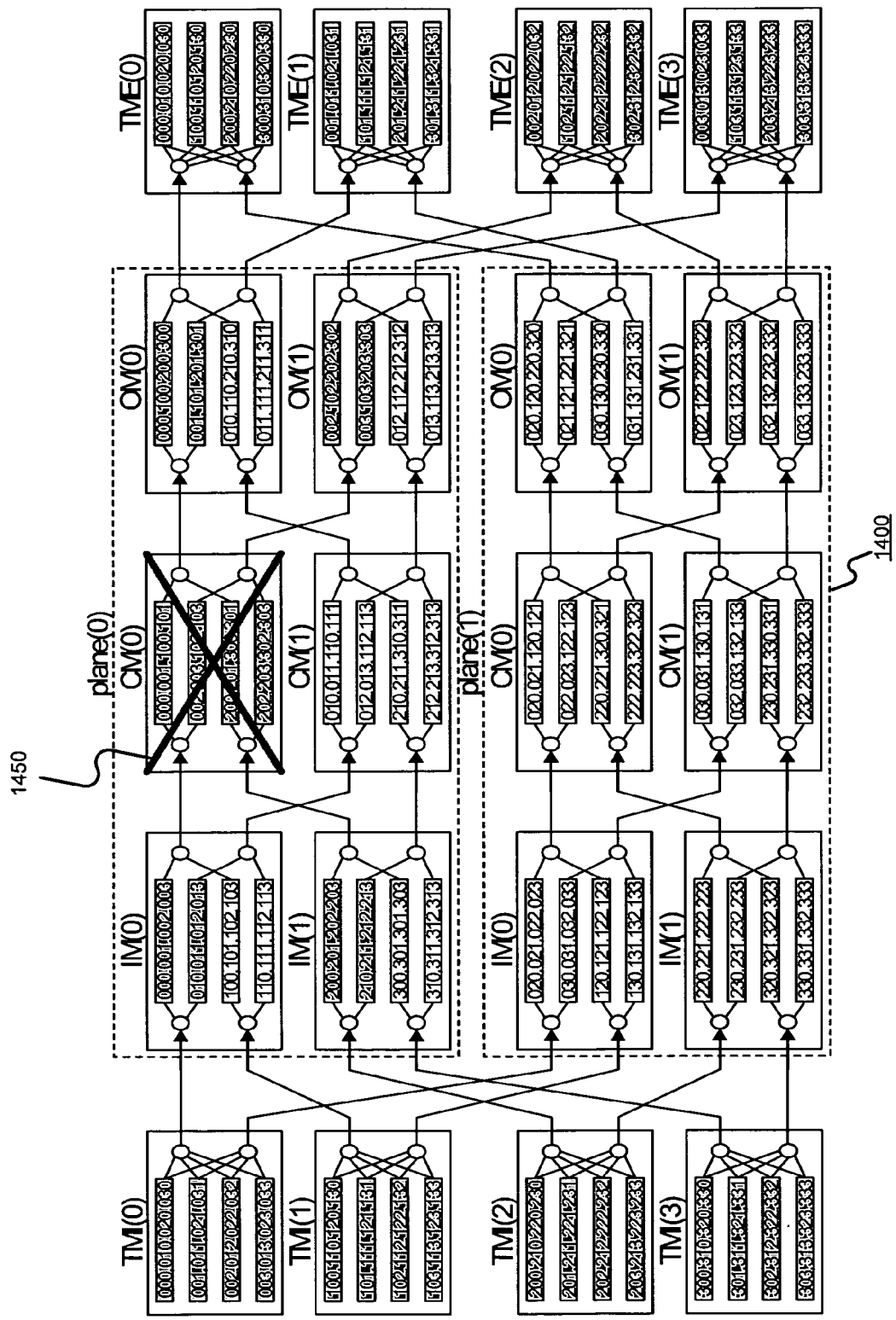

FIGS. 14A-14C illustrate a recovery of possible switch component failures in a switch consistent with the present invention.

Component failure can be detected and recovered in a similar manner as link errors. For example, if all IMs report the link failures from the same TMI 1410, all TMIs except the failed TMI declare the TMI failure. Since TMI 1410 and TME 1420 are assumed to be located on the same line card, TMI 1410 failure may imply that the TME 1420 has also failed. FIG. 14A shows the affected flows by the TMI/TME failure. Each TMI recovers the failure in the same way as the link failure.

The IM failure is detected by the CMs. If all CMs report the link failures from the same IM 1430, all TMIs declare the IM failure. Since IM 1430 and OM 1440 are assumed to be located on the same line card, an IM 1430 failure may imply that the OM 1440 has also failed. FIG. 14B shows the affected flows by the IM/OM circuit pack failure. Each TMI recovers from the failure in the same way as the link failure.

The CM failure is detected by the OMs. If all OMs report the link failures from the same CM 1450, all TMIs declare the CM 1450 failure. As shown in FIG. 14C, a CM failure affects all flows. Therefore, the same scheme should not be used to recover the failure. One solution is that each TMI maintains a table that records the flow IDs of the last K (e.g., 64) cells, which were sent to the CM. Although the number of cells remaining in the switch fabric, which were sent to the CM can be larger than K, the probability is extremely small. Therefore, if the CM failure is informed, each TMI sends flush packets only to the TMEs, which are on the table.

Table 1 summarizes the impact of failures on the system performance. In the worst case, about 3% of the traffic will be flushed. Since the flush packet is delivered through the cell header, the recovery time will be short enough.

TABLE 1

IMPACT OF LINK/COMPONENT FAILURES

| failure | Affected Flows | N = 4096, n = 64 | Percentage |
|---|---|---|---|
| TMI->IM | N | 4,096 | 0.02% |
| IM->CM | N*n | 262,144 | 1.56% |
| CM->OM | N*n | 262,144 | 1.56% |
| OM->TME | N | 4,096 | 0.02% |
| TM | N | 4,096 | 0.02% |
| IM/OM | (2N − n)*n | 520,192 | 3.10% |
| CM | 64*N | 262,144 | 1.56% |

§ 4.5 Conclusions

As can be appreciated from the foregoing, the present invention has many advantages over the other approaches. First, since the traffic is dispatched to the switch fabric at the cell level in a round robin fashion, the load is evenly distributed. If the traffic is dispatched at the packet level or at the flow level, the load among multiple paths can be unbalanced.

Second, the re-sequencing buffer size is independent with the switch size. As the switch size grows, more memory for the re-sequencing at the output port is not needed. The re-sequencing buffer size is only dependent on the round trip time delay between the input port and the output port.

Third, the guaranteed bandwidth of a flow is not limited by the internal link speed of the switch fabric. For example, if the port speed is 10 Gbps, there are four (4) planes in the switch fabric, the internal link speed of the switch fabric is 2.5 Gbps, and the input port has a 10 Gbps flow, the flow can go through the switch fabric if no other input ports send traffics to the same output port. Therefore, the switch fabric can support a flow with a bandwidth as large as the port speed.

Fourth, the schemes are fault tolerable. When ACK packet(s) are lost, the VOQ manger can recover the loss of ACK packet(s) by updating the sequence tail pointer using the next ACK packet.

The present invention is not limited to the specific embodiments described.

What is claimed is:

1. For use in a system having an ingress traffic manager component having a plurality of virtual output queues, and an egress traffic manager component having a plurality of virtual input queues and a plurality of reassembly queues, a method comprising:
    tracking, for each of the virtual output queues, an available cell count;
    if the available cell count for a selected non-empty virtual output queue is greater than a predetermined value,
        sending a cell from the selected non-empty virtual output queue, and
        updating, in a first way, the available cell count corresponding to the selected non-empty virtual output queue;
    if a message is received from the egress traffic manager that indicates that an output port corresponding to the selected non-empty virtual output queue has moved in order a cell received out of order by the non-empty virtual input queue from the corresponding virtual input queue to a reassembly queue, updating, in a second way, the available cell count corresponding to the virtual output queue;
    identifying a link fault;
    sending a flush packet to the egress traffic manager component that received packets by the link that had a fault; and
    flushing associated virtual input queues associated with the ingress traffic manager component.

2. The method of claim 1 wherein the act of updating the available cell count corresponding to the selected non-empty virtual output queue in the first way includes decreasing the available cell count, and
    wherein the act of updating the available cell count corresponding to the virtual output queue in the second way includes increasing the available cell count.

3. The method of claim 1 further comprising:
    examining virtual output queues in a fair manner to find a non-empty virtual output queue.

4. The method of claim 1 further comprising:
    receiving a cell at the egress traffic component;
    determining whether or not the cell was received in order; and
    if it is determined that the cell was received in order, then
        generating the message,
        sending the message to the ingress traffic component, and
        moving the cell from the virtual input queue to the reassembly queue.

5. For use in a system having an ingress traffic manager component having a plurality of virtual output queues, and an egress traffic manager component having a plurality of virtual input queues and a plurality of reassembly queues, a method comprising:
    receiving a cell at a virtual input queue of the egress traffic manager component;
    determining whether or not the cell was received in order;
    if it is determined that the cell was received in order, then
        generating a message indicative of a cell received in order,
        sending the message indicative of the cell received in order to the ingress traffic manager component, and
        moving the cell from the virtual input queue to the reassembly queue;
    if it is determined that the cell was not received in order, then holding the cell in the virtual input queue until all prior cells are received;
    accepting the message indicative of the cell received in order in a virtual output queue;
    updating an available cell count corresponding to the virtual output queue;
    identifying a link fault;
    sending a flush packet to the egress traffic manager component that received packets by the link that had a fault; and
    flushing associated virtual input queues associated with the ingress traffic manager component.

6. For use in a system having an ingress traffic manager component having a plurality of virtual output queues, and an egress traffic manager component having a plurality of virtual input queues and a plurality of reassembly queues, a method of reducing a potential number of out-of-sequence cells sent from a first virtual output queue, the method comprising:
    maintaining an available cell count for the first virtual output queue, and sending a cell from the first virtual output queue only if the cell count is greater than a predetermined value;
    re-sequencing any out-of-sequence cells at the egress traffic manager component by storing cells received out of order in a location in the virtual input queue corresponding to the order of the cell and moving cells from the virtual input queue to the reassembly queue after all prior cells are received;
identifying a link fault;
sending a flush packet to the egress traffic manager component that received packets by the link that had a fault; and
flushing associated virtual input queues associated with the ingress traffic manager component.

7. The method of claim 6 wherein the act of maintaining an available cell count includes:
increasing the cell count when an output port corresponding to the first virtual output queue moves one or more in-sequence cells from a virtual input queue to a reassembly queue, and,
decreasing the cell count when the first virtual output queue sends one or more cells.

8. For use in a system having an ingress traffic manager component having a plurality of virtual output queues, and an egress traffic manager component having a plurality of virtual input queues and a plurality of reassembly queues, a method comprising:
tracking, for each of the virtual output queues, an available cell count using a first variable and a second variable;
for a non-empty virtual output queue, if a difference between the first variable and the second variable is less than a predetermined window value,
inserting the first variable, corresponding to the non-empty virtual output queue, into a cell as a sent sequence number;
sending the cell from the non-empty virtual output queue wherein the sent sequence number is used to determine where to store cells at a location in the virtual input queue, and
incrementing the first variable corresponding to the non-empty virtual output queue; and
for the non-empty virtual output queue, if a message including an acknowledge sequence number is received from the egress traffic manager component that an output port corresponding to the non-empty virtual output queue has moved a cell from its virtual input queue to a reassembly queue, then setting the second variable, corresponding to the non-empty virtual output queue, to a value of the acknowledge sequence number; and,
receiving a cell at the egress traffic manager component;
determining whether or not the cell was received in order; and
if it is determined that the cell was received in order, then
generating the message including the sent sequence number of the cell as an acknowledge sequence number,
sending the message to the ingress traffic manager component,
moving the cell from the virtual input queue to the reassembly queue along with cells with intervening sequence numbers that were received out of order;
identifying a link fault;
sending a flush packet to the egress traffic manager component that received packets by the link that had a fault; and
flushing associated virtual input queues associated with the ingress traffic manager component.

9. The method of claim 8 further comprising:
examining virtual output queues in a fair manner to find a non-empty virtual output queue.

10. For use in a system having an ingress traffic manager component having a plurality of virtual output queues, and an egress traffic manager component having a plurality of virtual input queues and a plurality of reassembly queues, a method comprising:
maintaining, for each of the virtual input queues, a pointer variable;
receiving a cell, including a sent sequence number, at the egress traffic component;
storing the cell in one virtual input queues as a function of the sent sequence number and not on the basis of the order that the cell was received;
determining whether or not the cell was received in order; and
if it is determined that the cell was received in order, then
generating a cell received in order message including the sent sequence number as an acknowledge sequence number,
sending the cell received in order message to the ingress traffic component, and
moving the cell from the virtual input queue to the reassembly queue; for a virtual output queue, accepting the cell received in order message; updating an available cell count corresponding to the virtual output queue;
identifying a link fault;
sending a flush packet to the egress traffic manager component that received packets by the link that had a fault; and
flushing associated virtual input queues associated with the ingress traffic manager component.

11. The method of claim 10 wherein the act of determining whether or not the cell was received in order uses the pointer variable for the virtual input queue in which the cell was received in order and the sent sequence number of the cell.

12. The method of claim 11 wherein the cell is determined to be received in order if the pointer variable for the virtual input queue equals the sent sequence number of the cell.

13. For use in a system having an ingress traffic manager component having a plurality of virtual output queues, and an egress traffic manager component having a plurality of virtual input queues and a plurality of reassembly queues, an apparatus comprising:
for each of the virtual output queues, at least one component configured for tracking an available cell count;
wherein for each of the virtual output queues that are not empty, the component is further configured to
send a cell from the virtual output queue, and
update, in a first way, the available cell count corresponding to the virtual
output queue, if the available cell count is greater than a predetermined value; and
wherein for each of the virtual output queues, the at least one component is further configured for updating, in a second way, the available cell count corresponding to the virtual output queue if a message is received from the egress traffic manager component that an output port corresponding to the virtual output queue has moved a cell received out of order in the virtual input queue from its virtual input queue to a reassembly queue, wherein the at least one component is further configured to reorder into the reassembly queue cells received out of order in the virtual input port; and
a component for identifying a link fault;
a component for sending a flush packet to an egress traffic manager component that received packets by the link that had a fault; and
a component for flushing associated virtual input queues associated with the ingress traffic manager component.

14. The apparatus of claim 13 wherein the component for updating the available cell count corresponding to each of the virtual output queues in the first way includes a component for decreasing the available cell count, and
wherein the component for updating the available cell count corresponding to each of the virtual output queues in the second way is further configured for increasing the available cell count.

15. The apparatus of claim 13 further comprising:
a component for examining virtual output queues in a fair manner to find a non-empty virtual output queue.

16. The apparatus of claim 13 further comprising:
a cell receiving component for receiving a cell at the egress traffic component;
a determining component for determining whether or not the cell was received in order; and
at least another component for
generating the message,
sending the message to the ingress traffic component, and
moving the cell from the virtual input queue to the reassembly queue, if it is
determined that the cell was received in order.

17. For use in a system having an ingress traffic manager component having a plurality of virtual output queues, and an egress traffic manager component having a plurality of virtual input queues and a plurality of reassembly queues, an apparatus comprising:
means for sending cells front a virtual output queue in such a way that limits a potential number of out-of-sequence cells, wherein the potential number of out-of-sequence cells is limited by:
means for maintaining an available cell count for the virtual output queue, and
means for determining when the cell count is greater than a predetermined
value and sending a cell from the virtual output queue only when the cell
count is greater than the predetermined value; and
means for re-sequencing any out-of-sequence cells at the egress traffic manager component by storing the cell received in one of the virtual input queues in a location based on the order that the cell was sent and not the order that the cell was received;
means for identifying a link fault;
means for sending a flush packet to an egress traffic manager component that received packets by the link that had a fault; and
means for flushing associated virtual input queues associated with the ingress traffic manager component.

18. For use in a system having an ingress traffic manager component having a plurality of virtual output queues, and an egress traffic manager component having a plurality of virtual input queues and a plurality of reassembly queues, apparatus comprising:
means for tracking, for at least one of the virtual output queues, an available cell count using a first variable and a second variable;
means for determining that the at least one virtual output queue is non-empty and;
inserting the first variable, corresponding to the non-empty virtual output queue, into a cell as a sent sequence number;
sending the cell from the non-empty virtual output queue, and
incrementing the first variable corresponding to the non-empty virtual output queue,
wherein the means inserts, sends and increments if a difference between the first variable and the second variable is less than a predetermined window value;
means, for the at least one virtual output queue, far setting the second variable, corresponding to the at least one virtual output queue, to a value of the acknowledge sequence number if a message including an acknowledge sequence number is received from the egress traffic manager component that an output port corresponding to the at least one virtual output queue has moved a cell from its virtual input queue to a reassembly queue;
means for storing a cell as a function of the sequence number in the virtual input queue so that cells can be received out of order and reordered when moving the cells to the reassembly queue;
means for identifying a link fault;
means for sending a flush packet to the egress traffic manager component that receive packets by the link that had a fault; and
means for flushing associated virtual input queues associated wit the ingress traffic manager component.

19. The apparatus of claim 18 further comprising:
means for examining virtual output queues in a fair manner to find a non-empty virtual output queue.

20. The apparatus of claim 18 further comprising:
means for receiving a cell at the egress traffic manager component;
means for determining whether or not the cell was received in order; and
means for,
generating the message including the sent sequence number of the cell as an acknowledge sequence number,
sending the message to the ingress traffic component, and
moving the cell from the virtual input queue to the reassembly queue when it is determined that the cell was received in order.

21. The method of claim 3 wherein the examining of the virtual output queues in a fair manner comprises a round robin fashion.

22. The method of claim 9 wherein the examining of the virtual output queues in a fair manner comprises a round robin fashion.

23. The apparatus of claim 15 wherein the component examining the virtual output queues in a fair manner uses a round robin technique.

* * * * *